(12) United States Patent
Jee et al.

(10) Patent No.: US 10,591,761 B2
(45) Date of Patent: Mar. 17, 2020

(54) FLEXIBLE PLASTIC SUBSTRATE AND DISPLAY DEVICE INCLUDING SAME

(71) Applicants: SAMSUNG ELECTRONICS CO., LTD., Suwon-si, Gyeonggi-do (KR); SAMSUNG SDI CO., LTD., Yongin-si, Gyeonggi-do (KR)

(72) Inventors: Sang Soo Jee, Hwaseong-si (KR); Sun Jin Song, Seoul (KR); Chanjae Ahn, Suwon-si (KR); Sungwon Choi, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 221 days.

(21) Appl. No.: 15/789,695

(22) Filed: Oct. 20, 2017

(65) Prior Publication Data
US 2018/0113350 A1    Apr. 26, 2018

(30) Foreign Application Priority Data
Oct. 21, 2016 (KR) .................. 10-2016-0137545

(51) Int. Cl.
*C08G 73/14* (2006.01)
*G02F 1/1333* (2006.01)
(Continued)

(52) U.S. Cl.
CPC ....... *G02F 1/133305* (2013.01); *C08G 73/14* (2013.01); *C08J 7/047* (2013.01);
(Continued)

(58) Field of Classification Search
None
See application file for complete search history.

(56) References Cited

U.S. PATENT DOCUMENTS 6,329,041 B1 * 12/2001 Tsuchiya .................... C08J 7/04
428/195.1
9,018,343 B2 * 4/2015 Park ....................... C08G 73/14
525/436
(Continued)

FOREIGN PATENT DOCUMENTS

EP    2800104 A1    11/2014
EP    3040366 A1    7/2016
(Continued)

OTHER PUBLICATIONS

"Flexible screens coming, but not as soon as you would like" Technology News, 4 pp., http://gadgets.ndtv.com/mobiles/news/flexible-screens-coming-but-not-as-soon-as-you-would-like-354399.
(Continued)

*Primary Examiner* — Robert S Loewe
(74) *Attorney, Agent, or Firm* — Cantor Colburn LLP

(57) ABSTRACT

A flexible plastic substrate includes a film including a poly(amide-imide) copolymer; and a hard coating layer disposed on a first surface of the film, wherein the hard coating layer includes a crosslinked siloxane copolymer, and wherein the flexible plastic substrate has pencil hardness of greater than or equal to 2H under a vertical load of 1 kilogram according to ASTM D3363, a total light transmittance of greater than or equal to about 89% in a wavelength region of 350 nanometers to 750 nanometers.

19 Claims, 2 Drawing Sheets

(51) Int. Cl.
  *C09D 183/06* (2006.01)
  *C08J 7/04* (2020.01)
  *C08K 5/5419* (2006.01)
  *C08L 79/08* (2006.01)

(52) U.S. Cl.
  CPC ............ *C08K 5/5419* (2013.01); *C08L 79/08* (2013.01); *C09D 183/06* (2013.01); *C08J 2379/08* (2013.01); *C08J 2483/06* (2013.01)

(56) References Cited

U.S. PATENT DOCUMENTS

| | | | |
|---|---|---|---|
| 9,365,694 B2 | 6/2016 | Cho et al. | |
| 2004/0105987 A1* | 6/2004 | Hongo | G02B 1/105 |
| | | | 428/447 |
| 2006/0238867 A1* | 10/2006 | Takeda | G02B 27/288 |
| | | | 359/485.02 |
| 2013/0203937 A1* | 8/2013 | Cho | C08G 73/1039 |
| | | | 524/600 |
| 2014/0338959 A1 | 11/2014 | Jung et al. | |
| 2015/0093568 A1 | 4/2015 | Kim et al. | |
| 2015/0159044 A1* | 6/2015 | Bae | C08L 63/00 |
| | | | 523/435 |
| 2015/0225607 A1* | 8/2015 | Cho | C09D 179/08 |
| | | | 428/213 |
| 2015/0322223 A1* | 11/2015 | Woo | C08G 18/8025 |
| | | | 428/336 |
| 2015/0353760 A1* | 12/2015 | Bae | C09D 163/00 |
| | | | 523/456 |
| 2016/0040027 A1 | 2/2016 | Woo et al. | |
| 2016/0152866 A1 | 6/2016 | Woo et al. | |
| 2016/0154436 A1 | 6/2016 | Woo et al. | |
| 2016/0185926 A1* | 6/2016 | Song | C08J 7/047 |
| | | | 428/337 |
| 2016/0194448 A1 | 7/2016 | Song et al. | |

FOREIGN PATENT DOCUMENTS

| | | |
|---|---|---|
| FR | 3004720 A1 | 10/2014 |
| KR | 1020110047596 A | 5/2011 |
| KR | 1020140016199 A | 2/2014 |
| KR | 1020150035642 A | 4/2015 |
| KR | 101594213 B1 | 2/2016 |
| KR | 1020160065411 A | 6/2016 |
| KR | 1020160066679 A | 6/2016 |
| KR | 1020160067319 A | 6/2016 |
| KR | 1020160068126 A | 6/2016 |
| KR | 1020160074750 A | 6/2016 |
| KR | 1020160077563 A | 7/2016 |
| KR | 1020160101333 A | 8/2016 |
| KR | 1020160130090 A | 11/2016 |
| KR | 1020160130091 A | 11/2016 |
| KR | 1020160150186 A | 12/2016 |
| KR | 1020170000065 A | 1/2017 |
| KR | 1020170015644 A | 2/2017 |
| KR | 1020170016570 A | 2/2017 |
| KR | 1020170024662 A | 3/2017 |
| KR | 1020170036974 A | 4/2017 |
| KR | 1020170059550 A | 5/2017 |
| KR | 1020170074690 A | 6/2017 |

OTHER PUBLICATIONS

Extended European Search Report dated Mar. 7, 2018, of the corresponding European Patent Application No. 17197617.8.
J.D. Watling, "Condensation of Glycidoxypropyltrimethoxysilane to Afford Siloxane Pre-polymers Useful in the Preparation of Hardcoating Resins," Journal of Sol-Gel Science and Technology, XP001177680, ISSN: 0928-0707, DOI:10.1023/A:1026068814064, Sep. 1, 2003, vol. 28, Issue 2, pp. 167-174, New York.

* cited by examiner

FLEXIBLE PLASTIC SUBSTRATE AND DISPLAY DEVICE INCLUDING SAME

CROSS-REFERENCE TO RELATED APPLICATION

This application claims priority to and the benefit of Korean Patent Application No. 10-2016-0137545 filed in the Korean Intellectual Property Office on Oct. 21, 2016, the entire content of which is incorporated herein by reference.

BACKGROUND

1. Field

A plastic substrate and a display device including the same are disclosed.

2. Description of the Related Art

A portable display device such as a smart phone or a tablet PC has been an object of active research due to its high performance and popularity. For example, a light-weight flexible (i.e., bendable or foldable) portable display device has been studied and developed for commercialization. The portable display device of a liquid crystal display or the like includes a protective window for protecting a display module such as a liquid crystal layer. Currently, most portable display devices include a window including a rigid glass substrate. However, glass cannot be applied to a flexible display because it is not flexible and can be easily broken by an external force or impact. Therefore, attempts have been made to substitute a plastic film for the protective window in the display device.

However, it is very difficult to simultaneously satisfy the mechanical properties (e.g., hardness) and optical properties required for a protective window of a display device. Therefore, there remains a need for a flexible plastic film material which would have excellent hardness, flexibility, and optical properties suitable for use in a display device.

SUMMARY

An embodiment provides a flexible plastic substrate having high hardness and improved optical properties, as well as flexural characteristics.

Another embodiment provides a display device including the flexible plastic substrate.

In an embodiment, a flexible plastic substrate includes a film including a poly(amide-imide) copolymer; and a hard coating layer disposed on a first surface of the film, wherein the hard coating layer includes a crosslinked siloxane copolymer, and wherein the flexible plastic substrate has a pencil hardness of greater than or equal to 2H under a vertical load of 1 kilogram (kg) according to ASTM D3363, and a total light transmittance of greater than or equal to about 89% in a wavelength region of 350 nanometers (nm) to 750 nanometers (nm).

The crosslinked siloxane copolymer may include a cured product of a siloxane copolymer represented by at least one of Chemical Formula 1, Chemical Formula 2, or Chemical Formula 3:

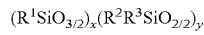   Chemical Formula 1 wherein, in Chemical Formula 1,
$R^1$ is a cross-linkable functional group or a hydrocarbyl group substituted with a cross-linkable functional group,
$R^2$ and $R^3$ are each independently hydrogen, a cross-linkable functional group, a hydrocarbyl group substituted with a cross-linkable functional group, a substituted or unsubstituted C1 to C20 alkyl group, or a substituted or unsubstituted C5 to C20 cycloalkyl group, provided that at least one of $R^2$ and $R^3$ is a substituted or unsubstituted C1 to C20 alkyl group, and
$0<x<1$, $0<y<1$, and $x+y=1$.

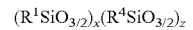   Chemical Formula 2

In Chemical Formula 2,
$R^1$ is a cross-linkable functional group or a hydrocarbyl group substituted with a cross-linkable functional group,
$R^4$ is an ultraviolet light absorbing functional group or a C1 to C20 hydrocarbyl group substituted with an ultraviolet light absorbing functional group, and
$0<x<1$, $0<z<1$, and $x+z=1$.

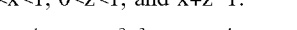   Chemical Formula 3

In Chemical Formula 3,
$R^1$ is a cross-linkable functional group or a hydrocarbyl group substituted with a cross-linkable functional group,
$R^2$ and $R^3$ are each independently, hydrogen, a cross-linkable functional group, a hydrocarbyl group substituted with a cross-linkable functional group, a substituted or unsubstituted C1 to C20 alkyl group, or a substituted or unsubstituted C5 to C20 cycloalkyl group, provided that at least one of $R^2$ and $R^3$ is a substituted or unsubstituted C1 to C20 alkyl group,
$R^4$ is an ultraviolet light absorbing functional group or a C1 to C20 hydrocarbyl group substituted with an ultraviolet light absorbing functional group, and $0<x<1$, $0<y<1$, $0<z<1$, and $x+y+z=1$.

The cross-linkable functional group may be a (meth)acrylate group, an epoxy group, a glycidyl group, a glycidoxy group, an oxetanyl group, an oxetanyloxy group, or a combination thereof.

The ultraviolet light absorbing functional group may be a substituted or unsubstituted benzotriazole group, a substituted or unsubstituted benzophenone group, a substituted or unsubstituted hydroxybenzophenone group, a substituted or unsubstituted triazine group, a substituted or unsubstituted salicylate group, a substituted or unsubstituted cyanoacrylate group, a substituted or unsubstituted oxanilide group, a substituted or unsubstituted hydroxyphenyltriazine group, a substituted or unsubstituted hydroxyphenylbenzotriazole group, a substituted or unsubstituted hydroxyphenylbenzophenone group, or a combination thereof.

The siloxane copolymer represented by Chemical Formula 1 may be further represented by at least one of Chemical Formulae 1-1 to 1-9:

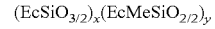   Chemical Formula 1-1

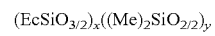   Chemical Formula 1-2

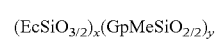   Chemical Formula 1-3

   Chemical Formula 1-4

   Chemical Formula 1-5

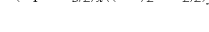   Chemical Formula 1-6

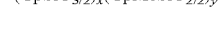   Chemical Formula 1-7

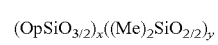   Chemical Formula 1-8

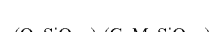   Chemical Formula 1-9

In Chemical Formulae 1-1 to 1-9, Ec is a (3,4-epoxycyclohexyl)ethyl group, Me is a methyl group, Gp is a 3-glycidoxypropyl group, Op is a 3-oxetanylpropyl group, $0<x<1$, $0<y<1$, and $x+y=1$.

The siloxane copolymer represented by Chemical Formula 2 may be further represented by at least one of Chemical Formulae 2-1 to 2-12:

| | |
|---|---|
| $(EcSiO_{3/2})_x(R^aSiO_{3/2})_z$ | Chemical Formula 2-1 |
| $(EcSiO_{3/2})_x(R^bSiO_{3/2})_z$ | Chemical Formula 2-2 |
| $(EcSiO_{3/2})_x(R^cSiO_{3/2})_z$ | Chemical Formula 2-3 |
| $(EcSiO_{3/2})_x(R^dSiO_{3/2})_z$ | Chemical Formula 2-4 |
| $(GpSiO_{3/2})_x(R^aSiO_{3/2})_z$ | Chemical Formula 2-5 |
| $(GpSiO_{3/2})_x(R^bSiO_{3/2})_z$ | Chemical Formula 2-6 |
| $(GpSiO_{3/2})_x(R^cSiO_{3/2})_z$ | Chemical Formula 2-7 |
| $(GpSiO_{3/2})_x(R^dSiO_{3/2})_z$ | Chemical Formula 2-8 |
| $(OpSiO_{3/2})_x(R^aSiO_{3/2})_z$ | Chemical Formula 2-9 |
| $(OpSiO_{3/2})_x(R^bSiO_{3/2})_z$ | Chemical Formula 2-10 |
| $(OpSiO_{3/2})_x(R^cSiO_{3/2})_z$ | Chemical Formula 2-11 |
| $(OpSiO_{3/2})_x(R^dSiO_{3/2})_z$ | Chemical Formula 2-12 |

In Chemical Formulae 2-1 to 2-12, Ec is a (3,4-epoxycyclohexyl)ethyl group, Gp is a 3-glycidoxypropyl group, Op is a 3-oxetanylpropyl group, $R^a$ is represented by Chemical Formula i, $R^b$ is represented by Chemical Formula ii, $R^c$ is represented by Chemical Formula iii, $R^d$ is represented by Chemical Formula iv, $0<x<1$, $0<z<1$, and $x+z=1$:

Chemical Formula i

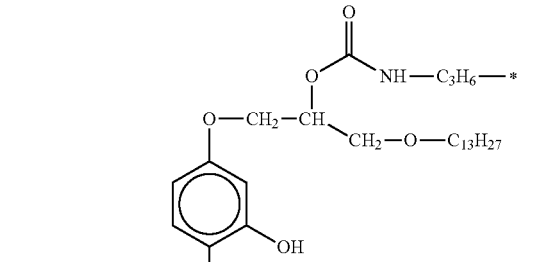

Chemical Formula ii

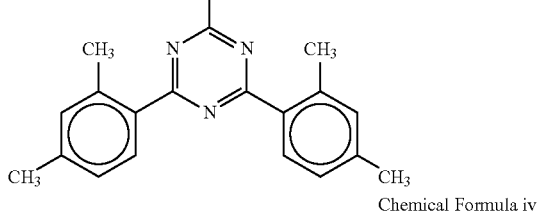

Chemical Formula iii

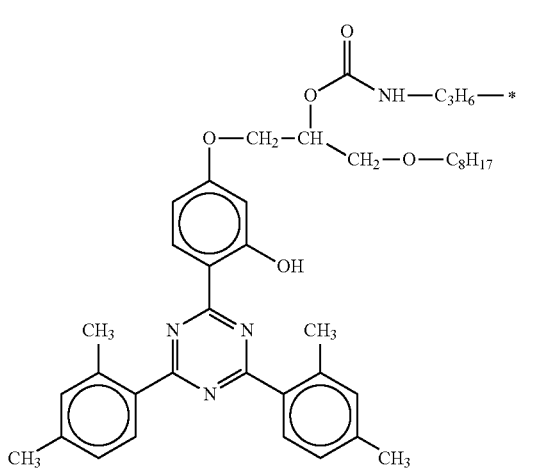

Chemical Formula iv

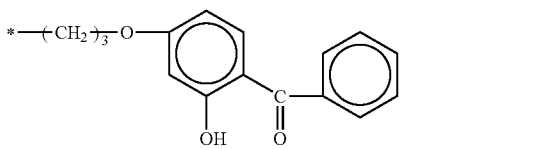

In Chemical Formula i to Chemical Formula iv, * indicates a linking point. The siloxane copolymer represented by Chemical Formula 3 may be further represented by at least one of Chemical Formulae 3-1 to 3-36:

| | |
|---|---|
| $(EcSiO_{3/2})_x(EcMeSiO_{2/2})_y(R^aSiO_{3/2})_z$ | Chemical Formula 3-1 |
| $(EcSiO_{3/2})_x(EcMeSiO_{2/2})_y(R^bSiO_{3/2})_z$ | Chemical Formula 3-2 |
| $(EcSiO_{3/2})_x(EcMeSiO_{2/2})_y(R^cSiO_{3/2})_z$ | Chemical Formula 3-3 |
| $(EcSiO_{3/2})_x(EcMeSiO_{2/2})_y(R^dSiO_{3/2})_z$ | Chemical Formula 3-4 |
| $(EcSiO_{3/2})_x((Me)_2SiO_{2/2})_y(R^aSiO_{3/2})_z$ | Chemical Formula 3-5 |
| $(EcSiO_{3/2})_x((Me)_2SiO_{2/2})_y(R^bSiO_{3/2})_z$ | Chemical Formula 3-6 |
| $(EcSiO_{3/2})_x((Me)_2SiO_{2/2})_y(R^cSiO_{3/2})_z$ | Chemical Formula 3-7 |
| $(EcSiO_{3/2})_x((Me)_2SiO_{2/2})_y(R^dSiO_{3/2})_z$ | Chemical Formula 3-8 |
| $(EcSiO_{3/2})_x(GpMeSiO_{2/2})_y(R^aSiO_{3/2})_z$ | Chemical Formula 3-9 |
| $(EcSiO_{3/2})_x(GpMeSiO_{2/2})_y(R^bSiO_{3/2})_z$ | Chemical Formula 3-10 |
| $(EcSiO_{3/2})_x(GpMeSiO_{2/2})_y(R^cSiO_{3/2})_z$ | Chemical Formula 3-11 |
| $(EcSiO_{3/2})_x(GpMeSiO_{2/2})_y(R^dSiO_{3/2})_z$ | Chemical Formula 3-12 |
| $(GpSiO_{3/2})_x(EcMeSiO_{2/2})_y(R^aSiO_{3/2})_z$ | Chemical Formula 3-13 |

| | |
|---|---|
| $(GpSiO_{3/2})_x(EcMeSiO_{2/2})_y(R^bSiO_{3/2})_z$ | Chemical Formula 3-14 |
| $(GpSiO_{3/2})_x(EcMeSiO_{2/2})_y(R^cSiO_{3/2})_z$ | Chemical Formula 3-15 |
| $(GpSiO_{3/2})_x(EcMeSiO_{2/2})_y(R^dSiO_{3/2})_z$ | Chemical Formula 3-16 |
| $(GpSiO_{3/2})_x((Me)_2SiO_{2/2})_y(R^aSiO_{3/2})_z$ | Chemical Formula 3-17 |
| $(GpSiO_{3/2})_x((Me)_2SiO_{2/2})_y(R^bSiO_{3/2})_z$ | Chemical Formula 3-18 |
| $(GpSiO_{3/2})_x((Me)_2SiO_{2/2})_y(R^cSiO_{3/2})_z$ | Chemical Formula 3-19 |
| $(GpSiO_{3/2})_x((Me)_2SiO_{2/2})_y(R^dSiO_{3/2})_z$ | Chemical Formula 3-20 |
| $(GpSiO_{3/2})_x(GpMeSiO_{2/2})_y(R^aSiO_{3/2})_z$ | Chemical Formula 3-21 |
| $(GpSiO_{3/2})_x(GpMeSiO_{2/2})_y(R^bSiO_{3/2})_z$ | Chemical Formula 3-22 |
| $(GpSiO_{3/2})_x(GpMeSiO_{2/2})_y(R^cSiO_{3/2})_z$ | Chemical Formula 3-23 |
| $(GpSiO_{3/2})_x(GpMeSiO_{2/2})_y(R^dSiO_{3/2})_z$ | Chemical Formula 3-24 |
| $(OpSiO_{3/2})_x(EcMeSiO_{2/2})_y(R^aSiO_{3/2})_z$ | Chemical Formula 3-25 |
| $(OpSiO_{3/2})_x(EcMeSiO_{2/2})_y(R^bSiO_{3/2})_z$ | Chemical Formula 3-26 |
| $(OpSiO_{3/2})_x(EcMeSiO_{2/2})_y(R^cSiO_{3/2})_z$ | Chemical Formula 3-27 |
| $(OpSiO_{3/2})_x(EcMeSiO_{2/2})_y(R^dSiO_{3/2})_z$ | Chemical Formula 3-28 |
| $(OpSiO_{3/2})_x((Me)_2SiO_{2/2})_y(R^aSiO_{3/2})_z$ | Chemical Formula 3-29 |
| $(OpSiO_{3/2})_x((Me)_2SiO_{2/2})_y(R^bSiO_{3/2})_z$ | Chemical Formula 3-30 |
| $(OpSiO_{3/2})_x((Me)_2SiO_{2/2})_y(R^cSiO_{3/2})_z$ | Chemical Formula 3-31 |
| $(OpSiO_{3/2})_x((Me)_2SiO_{2/2})_y(R^dSiO_{3/2})_z$ | Chemical Formula 3-32 |
| $(OpSiO_{3/2})_x(GpMeSiO_{2/2})_y(R^aSiO_{3/2})_z$ | Chemical Formula 3-33 |
| $(OpSiO_{3/2})_x(GpMeSiO_{2/2})_y(R^bSiO_{3/2})_z$ | Chemical Formula 3-34 |
| $(OpSiO_{3/2})_x(GpMeSiO_{2/2})_y(R^cSiO_{3/2})_z$ | Chemical Formula 3-35 |
| $(OpSiO_{3/2})_x(GpMeSiO_{2/2})_y(R^dSiO_{3/2})_z$ | Chemical Formula 3-36 |

In Chemical Formulae 3-1 to 3-36, Ec is a 3,4-epoxycyclohexylethyl group, Me is a methyl group, Gp is a 3-glycidoxypropyl group, Op is a 3-oxetanylpropyl group, $R^a$ is represented by Chemical Formula i, $R^b$ is represented by Chemical Formula ii, $R^c$ is represented by Chemical Formula iii, $R^d$ is represented by Chemical Formula iv, $0<x<1$, $0<y<1$, $0<z<1$, and $x+y+z=1$.

The hard coating layer may further include a nanoparticle.

The nanoparticle may include silica, titania, barium titanate, zirconia, barium sulfate, alumina, hafnium oxide, or a combination thereof.

The hard coating layer may further include a colorant having a maximum visible absorption peak at a wavelength of greater than or equal to 570 nanometers (nm).

The plastic substrate may further include a rear coating layer disposed on a second surface of the film opposite from the first surface on which the hard coating layer is disposed.

The rear coating layer may include a colorant having a maximum visible absorption peak at a wavelength of greater than or equal to 570 nanometers (nm).

The rear coating layer may include a (meth)acrylate polymer, a polycaprolactone, a urethane-(meth)acrylate copolymer, polyrotaxane, an epoxy resin, perfluoropolyether, a crosslinked or uncrosslinked siloxane copolymer, or a combination thereof.

A thickness of the poly(amide-imide) copolymer film may range from about 10 micrometers (μm) to about 200 micrometers (μm).

A thickness of the hard coating layer may range from about 5 micrometers (μm) to about 50 micrometers (μm).

A thickness of the rear coating layer may range from about 30 nanometers (nm) to about 300 nanometers (nm).

The poly(amide-imide) copolymer may be a product of a reaction between a tetracarboxylic acid dianhydride represented by Chemical Formula 6, a diamine represented by Chemical Formula 7, and a dicarboxylic acid derivative represented by Chemical Formula 9:

Chemical Formula 6

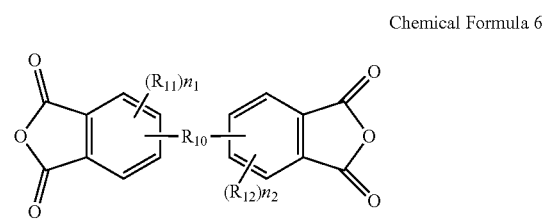

wherein, in Chemical Formula 6, $R^{10}$ is a single bond, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$—, or —C(=O)NH—, wherein, $1\le n\le10$, $1\le p\le10$, and $1\le q\le10$, $R^{11}$ and $R^{12}$ are each the same or different and are independently a halogen, a hydroxy group, a substituted or unsubstituted C1 to C10 aliphatic group, a substituted or unsubstituted C6 to C20 aryl group, a group of the formula —OR$^{201}$ wherein R$^{201}$ is a C1 to C10 aliphatic group, or a group of the formula —SiR$^{210}$R$^{211}$R$^{212}$ wherein R$^{210}$, R$^{211}$, and R$^{212}$ are each the same or different and are independently hydrogen or a C1 to C10 aliphatic group, and n1 and n2 are each the same or different and are independently an integer of 0 to 3.

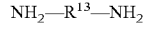 Chemical Formula 7

In Chemical Formula 7, $R^{13}$ is represented by Chemical Formula 8:

Chemical Formula 8

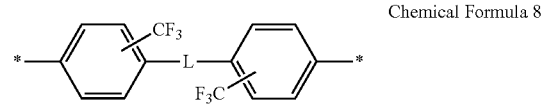

wherein, in Chemical Formula 8,

L is a single bond, —CONH—, -Ph-CONH-Ph-, or —NHCO-Ph-CONH— wherein Ph is a substituted or unsubstituted phenylene group, each linked to adjacent groups in an ortho, meta, or para configuration, and * is a point linked to nitrogen of an amino group.

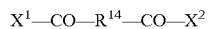 Chemical Formula 9

In Chemical Formula 9, $X^1$ and $X^2$ are each independently the same or different halogen, and $R^{14}$ is a phenylene group or a biphenylene group.

The tetracarboxylic acid dianhydride represented by Chemical Formula 6 may be further represented by at least one of Chemical Formula 10 and Chemical Formula 11, the diamine represented by Chemical Formula 7 may be 2,2'-bis(trifluoromethyl)benzidine, and the dicarboxylic acid derivative represented by Chemical Formula 9 may be terephthaloyl chloride:

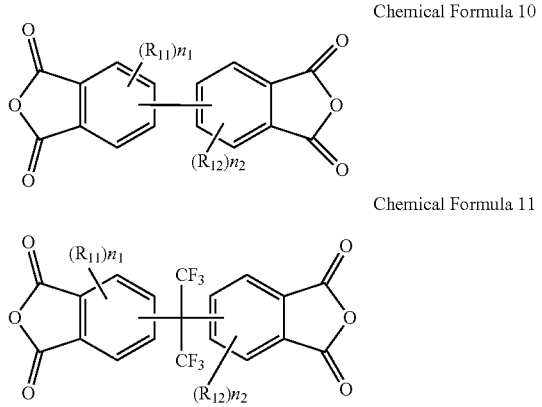

Chemical Formula 10

Chemical Formula 11 wherein, in Chemical Formula 10 and Chemical Formula 11, $R^{11}$, $R^{12}$, $n_1$, and $n_2$ are each the same as defined in Chemical Formula 6.

The poly(amide-imide) copolymer may be a product of a reaction between 2,2'-bis(trifluoromethyl)benzidine, the tetracarboxylic acid dianhydride represented by at least one of Chemical Formula 10 and Chemical Formula 11, and terephthaloyl chloride in a mole ratio of 1:0.1 to 0.5:0.5 to 0.9.

In another embodiment, a display device includes the flexible plastic substrate.

The flexible plastic substrate has high hardness and improved optical properties, and flexural characteristics. The flexible plastic substrate may be used as a flexible window film for a display device, or the like.

BRIEF DESCRIPTION OF THE DRAWINGS

These and/or other aspects will become more apparent and more readily appreciated from the following description of exemplary embodiments, taken with reference to the accompanying drawings, wherein.

DETAILED DESCRIPTION

Figure 1:
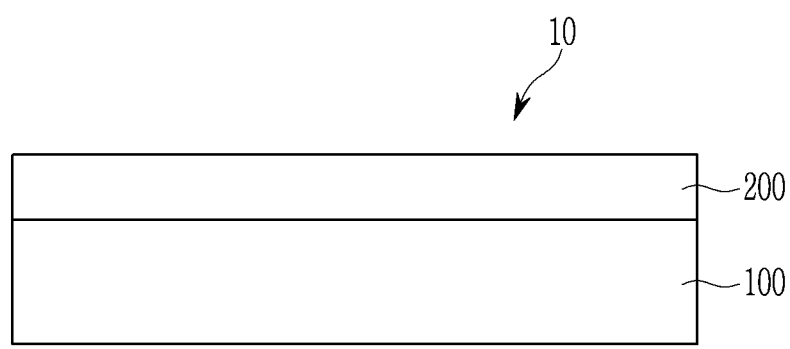
FIG. 1 is a schematic view showing a cross-section of a flexible plastic substrate according to an embodiment.

Hereinafter, exemplary embodiments will be described in detail, and may be realized by those who have common knowledge in the related art. However, the present disclosure may be embodied in many different forms and is not to be construed as limited to the exemplary embodiments set forth below.

Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of" when preceding a list of elements, modify the entire list of elements and do not modify the individual elements of the list.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, when a specific definition is not otherwise provided, the term "substituted" refers to a group or radical wherein at least one of the hydrogen atoms thereof is substituted with at least one (e.g., 1, 2, 3, 4, 5, 6, or more) substituents that are each independently a halogen atom (e.g., F, Cl, Br, or I), a hydroxy group, a nitro group, a cyano group, an amino group (e.g., —NH$_2$, —NH(R$^{100}$) or —N(R$^{101}$)(R$^{102}$), wherein R$^{100}$, R$^{101}$, and R$^{102}$ are the same or different, and are each independently a C1 to C10 alkyl group), an amidino group, a hydrazino group, a hydrazono group, a carboxy group, an ester group, a ketone group, a substituted or unsubstituted C1 to C20 alkyl group, a substituted or unsubstituted alicyclic organic group (e.g., a C3 to C10 cycloalkyl group), a substituted or unsubstituted C6 to C30 aryl group (e.g., a benzyl group, a naphthyl group, a fluorenyl group, etc.), a substituted or unsubstituted C2 to C20 alkenyl group, a substituted or unsubstituted C2 to C20 alkynyl group, a substituted or unsubstituted C3 to C20 heteroaryl group, and a substituted or unsubstituted heterocyclic group (e.g., a C3 to C30 heterocycloalkyl group in place of at least one hydrogen of the given functional group, or the substituents may be linked to each other to provide a ring.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof.

As used herein, when a specific definition is not otherwise provided, the term "alkyl group" refers to a refers to a straight or branched chain, saturated monovalent hydrocarbon group having the specified number of carbon atoms, for example a C1 to C30 alkyl group, and specifically a C1 to C15 alkyl group; the term "cycloalkyl group" refers to a monovalent saturated hydrocarbon ring group, having the specified number of carbon atoms, for example a C3 to C30 cycloalkyl group, and specifically a C3 to C18 cycloalkyl group; the term "alkoxy group" refers to an alkyl group as defined above with the indicated number of carbon atoms attached through an oxygen bridge (—O—), for example a C1 to C30 alkoxy group, and specifically a C1 to C18 alkoxy group; the term "carboxy group" refers to a carboxylic acid group of the formula —COOH, ester group, and carboxylic halide compound of the formula —COX wherein X is a halide; the term "ester group" refers to a C2 to C30 ester group of the formula —O(=O)OR, and specifically a C2 to C18 ester group, wherein the number of carbon atoms includes the carbonyl carbon; the term "ketone group" refers to a compound of the formula —C(O)R, for example a C2 to C30 ketone group, and specifically a C2 to C18 ketone group, wherein the number of carbon atoms includes the carbonyl carbon; the term "aryl group" refers to a monovalent cyclic group in which all ring members are carbon and at least one ring is aromatic, the group having the specified number of carbon atoms, for example a C6 to C30 aryl group, and specifically a C6 to C18 aryl group; and the term "alkenyl group" refers to a straight or branched chain hydrocarbon that comprises at least one carbon-carbon double bond, having the specified number of carbon atoms, and having a valence of at least one, for example a C2 to C30 alkenyl group, and specifically a C2 to C18 alkenyl group.

As used herein, the term "alkylene group" refers to a straight or branched saturated bivalent carbon chain having the indicated number of carbon atoms; the term "cycloalkylene group" refers to a bivalent saturated hydrocarbon ring group, having the specified number of carbon atoms; the term "alkyleneoxy group" refers to a bivalent alkoxy group as defined above with the indicated number of carbon atoms attached through a terminal oxygen and a terminal carbon (e.g., —O—CH$_2$CH$_2$—); the term "arylene group" refers to a bivalent cyclic group in which all ring members are carbon and at least one ring is aromatic, the group having the specified number of carbon atoms; the term As used herein, the term "aliphatic group" is a generalized group formed by removing one or more hydrogen atoms from a carbon atom of an aliphatic compound. An aliphatic compound is an acyclic or cyclic, saturated or unsaturated carbon compound, excluding aromatic compounds.

As used herein, the term "urethane group" refers to a divalent group of the formula —OCONH—.

As used herein, the term "heterocyclic group" refers to a group including 1 to 3 heteroatoms selected from O, S, N, P, Si, or a combination thereof in one ring, and may be, for example, pyridyl, thiophenyl, pyrazinyl, or the like, but are not limited thereto. "Heterocycloalkyl" is a saturated cyclic group having the indicated number of ring atoms containing from 1 to 3 heteroatoms chosen from N, O, and S, with remaining ring atoms being carbon.

As used herein, "(meth)acrylate group" refers to an acrylate group and a methacrylate group.

As used herein, when specific definition is not otherwise provided, the term "combination" refers to mixing or copolymerization. Herein, "copolymerization" refers to a random copolymerization, a block copolymerization, or a graft copolymerization.

As used herein, the term "polyimide" refers to "polyimide", "polyamic acid", and a combination thereof. The terms "polyimide" and "polyamic acid" may be used to have the same meanings. In addition, in the specification, "*" may refer to a point of attachment to nitrogen, silicon, or another atom in the various numbered chemical formulas.

A flexible plastic substrate according to an embodiment includes a film including a poly(amide-imide) copolymer and a hard coating layer disposed on a first surface of the film, wherein the hard coating layer comprises a crosslinked siloxane copolymer, and the flexible plastic substrate has a pencil hardness of greater than or equal to 2H measured under a vertical load of 1 kg according to ASTM D3363, a total light transmittance of greater than or equal to about 89% in a wavelength region of 350 nanometers (nm) to 750 nm, and flexural characteristics. As used herein, the term "flexural characteristics" means flexible or bendable without cracking or slagging, as determined by visual appearance.

Currently, most portable display devices include a window including a rigid glass substrate. However, glass is fragile to exterior impact, and can easily be broken when applied to a portable display device or the like; and also glass is not flexible, so it may be not suitable for a flexible display device. Therefore, there remains a need for a substitute material for use as in a display device. The present inventors have discovered a suitable substitute that includes a protective window having a flexible plastic film for use in a display device.

In order to use the film as a protective window of a display device, a plastic substrate should have high strength and hardness to serve as a protective substrate of a flexible device, to have suitable light transmittance, a desirable color, and other characteristics similar to a glass substrate so as to provide a similar functionality to a display device, and to have good flexural characteristics.

According to an embodiment, a flexible plastic substrate includes a film including a poly(amide-imide) copolymer and a hard coating layer disposed on a first surface of the film and having a crosslinked siloxane copolymer, for example that may be prepared from a siloxane copolymer having a cross-linkable functional group, can provide the mechanical properties and optical properties and is appropriate for a protective window for a flexible display device.

Hereinafter, referring to FIGS. 1 and 2, a flexible plastic substrate according to an embodiment is described in detail.

FIG. 1 is a schematic view showing a cross-section of a flexible plastic substrate 10 according to an embodiment which includes a film 100 including a poly(amide-imide) copolymer, for example a plastic film, and a hard coating layer 200 disposed on a first surface of the plastic film 100.

The flexible plastic substrate 10 has pencil hardness of greater than or equal to 2H measured under a vertical load of 1 kg according to ASTM D3363, and a total light transmittance of greater than or equal to about 89% in a wavelength region of 350 nm to 750 nm. The flexible plastic substrate 10 further includes flexural characteristics as defined herein.

The hard coating layer 200 of the flexible plastic substrate 10 may comprise a crosslinked siloxane copolymer, where the siloxane copolymer may be formed, for example, by curing a siloxane copolymer having a cross-linkable functional group and thus provide the flexible plastic substrate 10 with high mechanical properties and optical properties due to structural characteristics of the crosslinked siloxane copolymer and, simultaneously, having excellent flexural characteristics due to formation of a much denser network structure through a cross-linking bond among the cross-linkable functional groups during the curing.

The siloxane copolymer having the cross-linkable functional group may be represented by at least one of Chemical Formula 1 to Chemical Formula 3:

$$(R^1SiO_{3/2})_x(R^2R^3SiO_{2/2})_y \quad \text{Chemical Formula 1}$$

In Chemical Formula 1,
$R^1$ is a cross-linkable functional group or a hydrocarbyl group including a cross-linkable functional group,
$R^2$ and $R^3$ are each independently, hydrogen, a cross-linkable functional group, a hydrocarbyl group substituted with a cross-linkable functional group, a substituted or unsubstituted C1 to C20 alkyl group, or a substituted or unsubstituted C5 to C20 cycloalkyl group, provided that at least one of $R^2$ and $R^3$ is a substituted or unsubstituted C1 to C20 alkyl group,
$0<x<1$, $0<y<1$, and $x+y=1$.

$$(R^1SiO_{3/2})_x(R^4SiO_{3/2})_z \quad \text{Chemical Formula 2}$$

In Chemical Formula 2,
$R^1$ is a cross-linkable functional group or a hydrocarbyl group substituted with a cross-linkable functional group,
$R^4$ is an ultraviolet light absorbing functional group or a hydrocarbyl group substituted with an ultraviolet light absorbing functional group,
$0<x<1$, $0<z<1$, and $x+z=1$.

$$(R^1SiO_{3/2})_x(R^2R^3SiO_{2/2})_y(R^4SiO_{3/2})_z \quad \text{Chemical Formula 3}$$

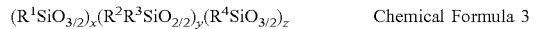

In Chemical Formula 3,
$R^1$ is a cross-linkable functional group or a hydrocarbyl group substituted with a cross-linkable functional group;
$R^2$ and $R^3$ are each independently hydrogen, a cross-linkable functional group, a hydrocarbyl group substituted with a cross-linkable functional group, a substituted or unsubstituted C1 to C20 alkyl group, or a substituted or unsubstituted C5 to C20 cycloalkyl group, provided that at least one of $R^2$ and $R^3$ is a substituted or unsubstituted C1 to C20 alkyl group,
$R^4$ is an ultraviolet light absorbing functional group or a hydrocarbyl group substituted with an ultraviolet light absorbing functional group;
$0<x<1$, $0<y<1$, $0<z<1$, and $x+y+z=1$.

The cross-linkable functional group refers to a functional group capable of a cross-linking reaction to form a chemical crosslink by heat and/or light. For example, the cross-linkable functional group may include a (meth)acrylate group, an epoxy group, or a combination thereof, but is not limited thereto, and may include any suitable cross-linkable functional group as long as it does not have unfavorable effects on optical properties and mechanical properties of the flexible plastic substrate. For example, the cross-linkable functional group may include a (meth)acrylate group, an epoxy group (which as used herein includes terminal glycidyl group, a terminal glycidoxy group, in internal glycidyl group and an internal glycidyl group), an oxetanyl group, an oxetanyloxy group, or the like, and the "hydrocarbyl group substituted with a cross-linkable functional group" may include a C1 to C20 hydrocarbyl group substituted with an epoxy group, a C1 to C20 hydrocarbyl group substituted with a glycidyl group, a C1 to C20 hydrocarbyl group substituted with a glycidoxy group, a C1 to C20 hydrocarbyl group substituted with an oxetanyl group, or a combination thereof. For example, the C1 to C20 hydrocarbyl group substituted with the cross-linkable functional group may be a C5 to C20 cycloalkyl group substituted with an epoxy group, a C1 to C10 alkyl group substituted with an epoxy group, a C1 to C20 alkyl group substituted with an oxetanyloxy group, or a combination thereof.

The ultraviolet (UV) light absorbing functional group is a functional group capable of absorbing UV light in a wavelength region of less than or equal to 400 nm, for example 100 nm to 400 nm.

For example, the ultraviolet (UV) light absorbing functional group may be a substituted or unsubstituted benzotriazole group, a substituted or unsubstituted benzophenone group, a substituted or unsubstituted hydroxybenzophenone group, a substituted or unsubstituted triazine group, a substituted or unsubstituted salicylate group, a substituted or unsubstituted cyanoacrylate group, a substituted or unsubstituted oxanilide group, a substituted or unsubstituted hydroxyphenyltriazine group, a substituted or unsubstituted hydroxyphenylbenzotriazole group, a substituted or unsubstituted hydroxyphenylbenzophenone group, but is not limited thereto.

The flexible plastic substrate achieves a high hardness and flexibility by including the hard coating layer prepared from the cured siloxane copolymer derived from the siloxane copolymer represented by Chemical Formula 1. The siloxane copolymer represented by Chemical Formula 1 may control hardness and flexural characteristics of the flexible plastic substrate by controlling a ratio of a structural unit represented by the Chemical Formula ($R^1SiO_{3/2}$) and a structural unit represented by the Chemical Formula ($R^2R^3SiO_{2/2}$). For example, in Chemical Formula 1, $0.20 \leq x \leq 0.999$, $0.001 \leq y \leq 0.80$, for example, $0.20 \leq x \leq 0.99$, $0.01 \leq x \leq 0.80$, for example, $0.80 \leq x \leq 0.99$, $0.01 \leq y \leq 0.20$ may be realized. Within the ranges, the hardness and flexural characteristics of the plastic substrate may be improved.

$R^1$ of Chemical Formula 1 may provide the siloxane copolymer with cross-linking properties and functionality. For example, $R^1$ may be a (3,4-epoxycyclohexyl)methyl group, a (3,4-epoxycyclohexyl)ethyl group, a (3,4-epoxycyclohexyl)propyl group, a 3-glycidoxypropyl group, a 3-oxetanylmethyl group, a 3-oxetanylethyl group, 3-oxetanylpropyl group, a 3-oxetanyloxy (3-oxetanyloxy) group.

$R^2$ and $R^3$ of Chemical Formula 1 may each provide the siloxane copolymer with cross-linking properties and/or flexural characteristics. In an embodiment, $R^2$ may be a substituted or unsubstituted C1 to C20 alkyl group and $R^3$ may be a cross-linkable functional group. In this case, cross-linking properties of the siloxane copolymer may further be increased, which can lead to further improved hardness of the plastic substrate. In another embodiment, $R^2$ and $R^3$ may each independently be a (3,4-epoxycyclohexyl)methyl group, a (3,4-epoxycyclohexyl)ethyl group, a (3,4-epoxycyclohexyl)propyl group, a glycidoxypropyl group, a methyl group, an ethyl group, or the like.

The siloxane copolymer represented by Chemical Formula 1 may include at least one of Chemical Formulae 1-1 to 1-9, but is not limited thereto:

| | |
|---|---|
| $(EcSiO_{3/2})_x(EcMeSiO_{2/2})_y$ | Chemical Formula 1-1 |
| $(EcSiO_{3/2})_x((Me)_2SiO_{2/2})_y$ | Chemical Formula 1-2 |
| $(EcSiO_{3/2})_x(GpMeSiO_{2/2})_y$ | Chemical Formula 1-3 |
| $(GpSiO_{3/2})_x(EcMeSiO_{2/2})_y$ | Chemical Formula 1-4 |
| $(GpSiO_{3/2})_x((Me)_2SiO_{2/2})_y$ | Chemical Formula 1-5 |
| $(GpSiO_{3/2})_x(GpMeSiO_{2/2})_y$ | Chemical Formula 1-6 |
| $(OpSiO_{3/2})_x(EcMeSiO_{2/2})_y$ | Chemical Formula 1-7 |
| $(OpSiO_{3/2})_x((Me)_2SiO_{2/2})_y$ | Chemical Formula 1-8 |
| $(OpSiO_{3/2})_x(GpMeSiO_{2/2})_y$ | Chemical Formula 1-9 |

In Chemical Formulae 1-1 to 1-9, Ec is a (3,4-epoxycyclohexyl)ethyl group, Me is a methyl group, Gp is a 3-glycidoxypropyl group, Op is a 3-oxetanylpropyl group, $0<x<1$, $0<y<1$, and $x+y=1$.

A weight average molecular weight (Mw) of the siloxane copolymer represented by Chemical Formula 1 may range from about 4,000 grams per mole (g/mol) to about 100,000 g/mol, for example about 4,500 g/mol to about 10,000 g/mol, as determined by Gel Permeation Chromatography (GPC). Within the ranges, the siloxane copolymer may be prepared and hardness and flexural characteristics may further improve.

A polydispersity index (PDI) of the siloxane copolymer represented by Chemical Formula 1 may range from about 1.0 to about 3.0, for example about 1.5 to about 2.5. Within the ranges, during formation of the hard coating layer coating-process properties may be good and coating properties may further be stabilized.

An epoxy equivalent of the siloxane copolymer represented by Chemical Formula 1 may range from about 0.1 mol/100 g to about 1.0 mol/100 g, for example about 0.3 mol/100 g to about 0.7 mol/100 g. Within the ranges, properties of the plastic substrate may be stabilized.

During curing of the siloxane copolymer represented by Chemical Formula 1, an initiator may be used in order to cure the cross-linkable functional group. The initiator may be a photocation initiator and/or photoradical initiator. The initiator may be used alone or as a mixture of two or more.

The photocation initiator may include any suitable photocation initiator, including those known to a person of ordinary skill in the art. For example, the photocation initiator may be an onium salt including a cation and an anion. For example, the cation may be diaryliodonium such as diphenyliodonium, 4-methoxydiphenyliodonium, bis(4-methylphenyl)iodonium, bis(4-tert-butylphenyl)iodonium, bis(dodecylphenyl)iodonium, iodonium (4-methylphenyl)[(4-(2-methylpropyl)phenyl)iodonium], or the like, triarylsulfonium such as triphenylsulfonium, diphenyl-4-thiophenoxyphenylsulfonium, or the like, bis[4-(diphenylsulfonio)phenyl]sulfide, or the like. For example, the anion may be hexafluorophosphate $(PF_6^-)$, tetrafluoroborate $(BF_4^-)$, hexafluoroantimonate $(SbF_6^-)$, hexafluoroarsenate $(AsF_6^-)$, hexachloroantimonate $(SbCl_6^-)$, or the like.

The photoradical initiator may be any suitable photoradical initiator, including those known to a person of ordinary skill in the art. For example, the photo-radical initiator may be at least one of a thioxanthone-based, phosphorus-based, triazine-based, acetophenone-based, benzophenone-based, benzoin-based, or an oxime-based initiator.

In case of the hard coating layer prepared by curing the siloxane copolymer represented by Chemical Formula 2, the flexible plastic substrate can have high hardness, flexural characteristics, and optical reliability such as light resistance reliability, and the like. Particularly, Chemical Formula 2 includes the ultraviolet (UV) light absorbing functional group or the hydrocarbyl group substituted with the ultraviolet (UV) light absorbing functional group as well as the cross-linkable functional group or the hydrocarbyl group substituted with a cross-linkable functional group, and thus a ratio of a structural unit represented by the formula $(R^1SiO_{3/2})$ and a structural unit represented by the formula $(R^4SiO_{3/2})$ may be appropriately controlled, whereby hardness and optical reliability of the plastic substrate including the hard coating layer prepared from the siloxane copolymer represented by Chemical Formula 2 may be controlled. For example, $0.20 \le x \le 0.999$, $0.001 \le z \le 0.80$, for example, $0.20 \le x \le 0.99$, $0.01 \le z \le 0.80$, and $0.80 \le x \le 0.99$, $0.01 \ z \le 0.20$ may be realized. Within the ranges, hardness, flexibility, and optical reliability of the plastic substrate may be improved.

$R^1$ of Chemical Formula 2 increases cross-linking properties for at least the same reasons as described for Chemical Formula 1.

$R^4$ of Chemical Formula 2 is a group for ultraviolet (UV) light absorption, for example, $R^4$ may be a substituted or unsubstituted hydroxybenzophenone group, a substituted or unsubstituted hydroxyphenyltriazine group, or may be represented by Chemical Formula 4:

*—$(R_x)_{n1}$-M-$(R_x)_{n2}$—$R_y$    Chemical Formula 4

In Chemical Formula 4, * is a linking point for Si, each $R_x$ is the same or different and is a substituted or unsubstituted C1 to C20 alkylene group, a substituted or unsubstituted C1 to C20 alkyleneoxy group, a substituted or unsubstituted C1 to C20 alkylene group further substituted with a urethane group at a terminal end or within the alkylene group, a substituted or unsubstituted C1 to C20 alkyleneoxy group further substituted with a urethane group at a terminal end or within the alkyleneoxy group, a substituted or unsubstituted C6 to C20 arylene group, or a combination thereof, n1 and n2 are each independently 0 or 1, M is a single bond, —O—, —S—, —NR— (wherein R is hydrogen or a C1 to C10 alkyl group), —CONH—, —OCONH—, —C=O—, or —C=S—, $R_y$ is a substituted or unsubstituted benzotriazole group, a substituted or unsubstituted benzophenone group, a substituted or unsubstituted hydroxybenzophenone group, a substituted or unsubstituted triazine group, a substituted or unsubstituted salicylate group, a substituted or unsubstituted cyanoacrylate group, a substituted or unsubstituted oxanilide group, a substituted or unsubstituted hydroxyphenyltriazine group, a substituted or unsubstituted hydroxyphenylbenzotriazole group, or a substituted or unsubstituted hydroxyphenylbenzophenone group.

In an example embodiment, each $R_x$ independently may be a substituted or unsubstituted C1 to C20 alkylene group or a substituted or unsubstituted C1 to C20 alkyleneoxy group, M may be oxygen (—O—) or —OCONH—, and $R_y$ may be a substituted or unsubstituted hydroxybenzophenone group, or a substituted or unsubstituted hydroxyphenyltriazine group.

In an embodiment, $R_y$ of Chemical Formula 4 may be a 2-hydroxybenzophenone group, a 2,4-dihydroxybenzophenone group, a 2-hydroxybenzophenone group, a 2-hydroxy-4-methoxybenzophenone group, a 2-hydroxy-4-methoxy-4'-methylbenzophenone group, a 2,2'-dihydroxy-4-methoxybenzophenone group, a 2,4,4'-trihydroxybenzophenone group, 2,2',4,4'-tetrahydroxybenzophenone group, a 2,3,4,4'-tetrahydroxybenzophenone group, a 2,3',4,4'-tetrahydroxybenzophenone group, or a 2,2'-dihydroxy-4,4'-dimethoxybenzophenone group, or a group represented by Chemical Formula 4-1, or the like:

Chemical Formula 4-1

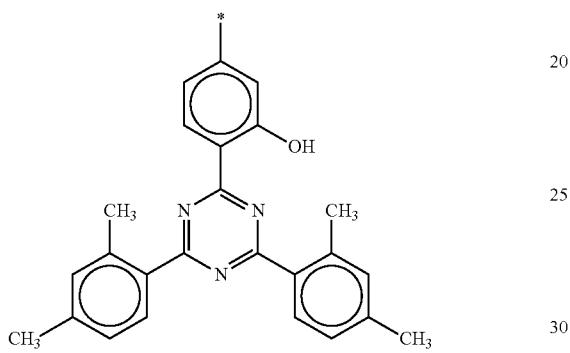

In Chemical Formula 4-1, * is a linking point.

In an embodiment, the siloxane copolymer represented by Chemical Formula 2 may be further represented by at least one of Chemical Formulae 2-1 to 2-12, but is not limited thereto:

| | |
|---|---|
| $(EcSiO_{3/2})_x(R^aSiO_{3/2})_z$ | Chemical Formula 2-1 |
| $(EcSiO_{3/2})_x(R^bSiO_{3/2})_z$ | Chemical Formula 2-2 |
| $(EcSiO_{3/2})_x(R^cSiO_{3/2})_z$ | Chemical Formula 2-3 |
| $(EcSiO_{3/2})_x(R^dSiO_{3/2})_z$ | Chemical Formula 2-4 |
| $(GpSiO_{3/2})_x(R^aSiO_{3/2})_z$ | Chemical Formula 2-5 |
| $(GpSiO_{3/2})_x(R^bSiO_{3/2})_z$ | Chemical Formula 2-6 |
| $(GpSiO_{3/2})_x(R^cSiO_{3/2})_z$ | Chemical Formula 2-7 |
| $(GpSiO_{3/2})_x(R^dSiO_{3/2})_z$ | Chemical Formula 2-8 |
| $(OpSiO_{3/2})_x(R^aSiO_{3/2})_z$ | Chemical Formula 2-9 |
| $(OpSiO_{3/2})_x(R^bSiO_{3/2})_z$ | Chemical Formula 2-10 |
| $(OpSiO_{3/2})_x(R^cSiO_{3/2})_z$ | Chemical Formula 2-11 |
| $(OpSiO_{3/2})_x(R^dSiO_{3/2})_z$ | Chemical Formula 2-12 |

In Chemical Formulae 2-1 to 2-12,

Ec is a (3,4-epoxycyclohexyl)ethyl group, Gp is a 3-glycidoxypropyl group, Op is a 3-oxetanylpropyl group, $R^a$ is represented by Chemical Formula i, $R^b$ is represented by Chemical Formula ii, $R^c$ is represented by Chemical Formula iii, $R^d$ is represented by Chemical Formula iv, $0<x<1$, $0<z<1$, and $x+z=1$:

Chemical Formula i

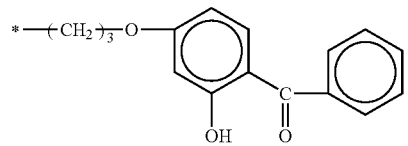

Chemical Formula ii

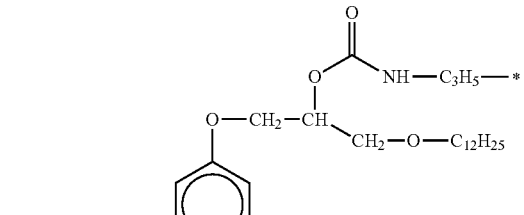

Chemical Formula iii

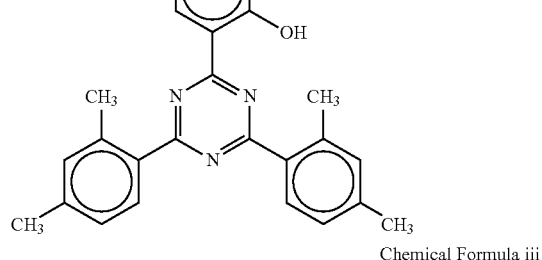

Chemical Formula iv

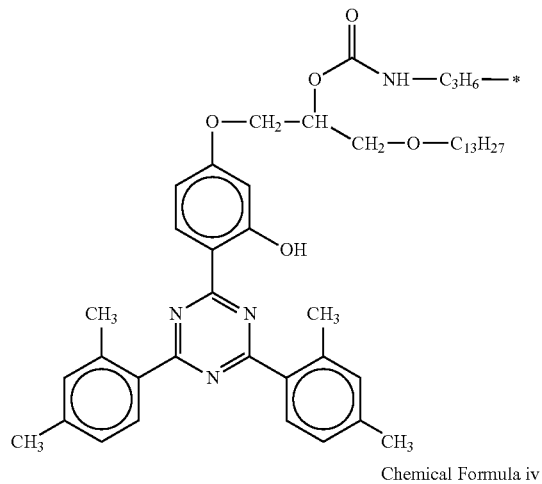

In Chemical Formulae i to iv, * is a linking point.

During curing of the siloxane copolymer represented by Chemical Formula 2, an initiator may be used in order to cure the cross-linkable functional group. The initiator may be the same as described above for the siloxane copolymer represented by Chemical Formula 1.

In case of the crosslinked siloxane copolymer of the hard coating layer prepared from the siloxane copolymer represented by Chemical Formula 3, the flexible plastic substrate according to an embodiment may have one or all of improved hardness, flexural characteristics, and optical reliability such as light resistance reliability. That is, the siloxane copolymer represented by Chemical Formula 3 increases hardness and flexural characteristics of the flexible plastic substrate due to the cross-linkable functional group and increases optical reliability such as light resistance reliability and the like of the flexible plastic substrate due to the ultraviolet (UV) light absorbing functional group.

The siloxane copolymer represented by Chemical Formula 3 may control hardness, flexural characteristics, and optical reliability of a window film including the crosslinked siloxane copolymer of the hard coating layer prepared therefrom by controlling a ratio of each silicon monomer that provides each of the structural units represented by $(R^1SiO_{3/2})$, $(R^2R^3SiO_{2/2})$, and $(R^4SiO_{3/2})$.

$R^1$, $R^2$, and $R^3$ of Chemical Formula 3 are the same as defined in Chemical Formula 1, and $R^4$ is the same as defined in Chemical Formula 2.

In Chemical Formula 3, $0.40 \leq x \leq 0.99$, $0.001 \leq y \leq 0.40$, $0.001 \leq z \leq 0.20$, for example, $0.80 \leq x \leq 0.98$, $0.005 \leq y \leq 0.10$, $0.001 \leq z \leq 0.10$, and $0.80 \leq x \leq 0.98$, $0.01 \leq y \leq 0.10$, $0.01 \leq z \leq 0.10$ may be realized. Within the ranges, hardness, flexibility, and light resistance reliability of the flexible plastic substrate may be improved.

In another embodiment, the siloxane copolymer represented by Chemical Formula 3 may be represented by at least one of Chemical Formula 3-1 to 3-36, but is not limited thereto:

| | |
|---|---|
| $(EcSiO_{3/2})_x(EcMeSiO_{2/2})_y(R^aSiO_{3/2})_z$ | Chemical Formula 3-1 |
| $(EcSiO_{3/2})_x(EcMeSiO_{2/2})_y(R^bSiO_{3/2})_z$ | Chemical Formula 3-2 |
| $(EcSiO_{3/2})_x(EcMeSiO_{2/2})_y(R^cSiO_{3/2})_z$ | Chemical Formula 3-3 |
| $(EcSiO_{3/2})_x(EcMeSiO_{2/2})_y(R^dSiO_{3/2})_z$ | Chemical Formula 3-4 |
| $(EcSiO_{3/2})_x((Me)_2SiO_{2/2})_y(R^aSiO_{3/2})_z$ | Chemical Formula 3-5 |
| $(EcSiO_{3/2})_x((Me)_2SiO_{2/2})_y(R^bSiO_{3/2})_z$ | Chemical Formula 3-6 |
| $(EcSiO_{3/2})_x((Me)_2SiO_{2/2})_y(R^cSiO_{3/2})_z$ | Chemical Formula 3-7 |
| $(EcSiO_{3/2})_x((Me)_2SiO_{2/2})_y(R^dSiO_{3/2})_z$ | Chemical Formula 3-8 |
| $(EcSiO_{3/2})_x(GpMeSiO_{2/2})_y(R^aSiO_{3/2})_z$ | Chemical Formula 3-9 |
| $(EcSiO_{3/2})_x(GpMeSiO_{2/2})_y(R^bSiO_{3/2})_z$ | Chemical Formula 3-10 |
| $(EcSiO_{3/2})_x(GpMeSiO_{2/2})_y(R^cSiO_{3/2})_z$ | Chemical Formula 3-11 |
| $(EcSiO_{3/2})_x(GpMeSiO_{2/2})_y(R^dSiO_{3/2})_z$ | Chemical Formula 3-12 |
| $(GpSiO_{3/2})_x(EcMeSiO_{2/2})_y(R^aSiO_{3/2})_z$ | Chemical Formula 3-13 |
| $(GpSiO_{3/2})_x(EcMeSiO_{2/2})_y(R^bSiO_{3/2})_z$ | Chemical Formula 3-14 |
| $(GpSiO_{3/2})_x(EcMeSiO_{2/2})_y(R^cSiO_{3/2})_z$ | Chemical Formula 3-15 |
| $(GpSiO_{3/2})_x(EcMeSiO_{2/2})_y(R^dSiO_{3/2})_z$ | Chemical Formula 3-16 |
| $(GpSiO_{3/2})_x((Me)_2SiO_{2/2})_y(R^aSiO_{3/2})_z$ | Chemical Formula 3-17 |
| $(GpSiO_{3/2})_x((Me)_2SiO_{2/2})_y(R^bSiO_{3/2})_z$ | Chemical Formula 3-18 |
| $(GpSiO_{3/2})_x((Me)_2SiO_{2/2})_y(R^cSiO_{3/2})_z$ | Chemical Formula 3-19 |
| $(GpSiO_{3/2})_x((Me)_2SiO_{2/2})_y(R^dSiO_{3/2})_z$ | Chemical Formula 3-20 |
| $(GpSiO_{3/2})_x(GpMeSiO_{2/2})_y(R^aSiO_{3/2})_z$ | Chemical Formula 3-21 |
| $(GpSiO_{3/2})_x(GpMeSiO_{2/2})_y(R^bSiO_{3/2})_z$ | Chemical Formula 3-22 |
| $(GpSiO_{3/2})_x(GpMeSiO_{2/2})_y(R^cSiO_{3/2})_z$ | Chemical Formula 3-23 |
| $(GpSiO_{3/2})_x(GpMeSiO_{2/2})_y(R^dSiO_{3/2})_z$ | Chemical Formula 3-24 |
| $(OpSiO_{3/2})_x(EcMeSiO_{2/2})_y(R^aSiO_{3/2})_z$ | Chemical Formula 3-25 |
| $(OpSiO_{3/2})_x(EcMeSiO_{2/2})_y(R^bSiO_{3/2})_z$ | Chemical Formula 3-26 |
| $(OpSiO_{3/2})_x(EcMeSiO_{2/2})_y(R^cSiO_{3/2})_z$ | Chemical Formula 3-27 |
| $(OpSiO_{3/2})_x(EcMeSiO_{2/2})_y(R^dSiO_{3/2})_z$ | Chemical Formula 3-28 |
| $(OpSiO_{3/2})_x((Me)_2SiO_{2/2})_y(R^aSiO_{3/2})_z$ | Chemical Formula 3-29 |
| $(OpSiO_{3/2})_x((Me)_2SiO_{2/2})_y(R^bSiO_{3/2})_z$ | Chemical Formula 3-30 |
| $(OpSiO_{3/2})_x((Me)_2SiO_{2/2})_y(R^cSiO_{3/2})_z$ | Chemical Formula 3-31 |
| $(OpSiO_{3/2})_x((Me)_2SiO_{2/2})_y(R^dSiO_{3/2})_z$ | Chemical Formula 3-32 |
| $(OpSiO_{3/2})_x(GpMeSiO_{2/2})_y(R^aSiO_{3/2})_z$ | Chemical Formula 3-33 |
| $(OpSiO_{3/2})_x(GpMeSiO_{2/2})_y(R^bSiO_{3/2})_z$ | Chemical Formula 3-34 |
| $(OpSiO_{3/2})_x(GpMeSiO_{2/2})_y(R^cSiO_{3/2})_z$ | Chemical Formula 3-35 |
| $(OpSiO_{3/2})_x(GpMeSiO_{2/2})_y(R^dSiO_{3/2})_z$ | Chemical Formula 3-36 |

In Chemical Formulae 3-1 to 3-36, Ec is a 3,4-epoxycyclohexylethyl group, Me is a methyl group, Gp is a 3-glycidoxypropyl group, Op is a 3-oxetanylpropyl group, $R^a$ is represented by Chemical Formula i, $R^b$ is represented by Chemical Formula ii, $R^c$ is represented by Chemical Formula iii, and $R^d$ is represented by Chemical Formula iv, wherein each of $R^a$, $R^b$, $R^c$, and $R^d$ are as defined for Chemical Formulae 2-1 to 2-12, $0 < x < 1$, $0 < y < 1$, $0 < z < 1$, and $x+y+z=1$.

During curing of the siloxane copolymer represented by Chemical Formula 3, an initiator may be used in order to cure the cross-linkable functional group. The initiator may be the same as described above for the siloxane copolymer represented by Chemical Formula 1.

Each of the siloxane copolymers represented by Chemical Formulae 1 to 3 may be cross-linked through $R^1$, which is a cross-linkable functional group or a hydrocarbyl group substituted with a cross-linkable functional group during curing. When an additional crosslinking agent is added to the siloxane copolymer, the siloxane copolymer may cross-link with the cross-linking agent, which may increase the degree of cross-linking of the crosslinked siloxane copolymer. In this case, hardness of the hard coating layer including the crosslinked siloxane copolymer may further improve, thereby further improving the hardness of the flexible plastic substrate including the hard coating layer. The cross-linking agent may contain a cross-linkable functional group, through which cross-linking may occur with the siloxane copolymer, thereby further improving the hardness of the plastic substrate including the same. In addition, the cross-linking agent may further include at least one of an acyclic aliphatic group, a cyclic aliphatic group, an aryl group, a hydrogenated aryl group, and/or an oxetane group, thereby further improving the flexibility of the flexible plastic substrate including the same. A single cross-linking agent may be used alone, or a combination thereof may be used.

For example, the cross-linking agent may be an acyclic aliphatic epoxy monomer, a cyclic aliphatic epoxy monomer, an aromatic epoxy monomer, a hydrogenated aromatic epoxy monomer, anoxetane monomer, or a combination thereof may be used.

Nonlimiting examples of the acyclic aliphatic epoxy monomer may include: 1,4-butanediol diglycidyl ether, 1,6-hexanediol diglycidyl ether, neopentylglycol diglycidyl ether, trimethylolpropane triglycidyl ether, polyethyleneglycol diglycidyl ether, glycerin triglycidyl ether, polypropylene glycol diglycidyl ether; polyglycidyl ethers of polyether polyols obtained by adding at least one alkylene oxide to an aliphatic polyhydric alcohol such as ethylene glycol, propylene glycol, and glycerine; diglycidyl esters of aliphatic long-chain dibasic acids; monoglycidyl ethers of aliphatic higher alcohols; glycidyl ethers of higher fatty acids; epoxidized soybean oil; butyl epoxy stearate; octyl epoxy stearate; epoxidized linseed oil; epoxidized polybutadiene, or the like; or a combination thereof may be used.

The cyclic aliphatic epoxy monomer is a compound in which an alicyclic group (i.e., cycloalkane group) has at least one epoxy group, and may include alicyclic epoxy carboxylate, alicyclic epoxy(meth)acrylate, or the like. Nonlimiting examples of the cyclic aliphatic epoxy monomer may include (3,4-epoxycyclohexyl)methyl-3',4'-epoxycyclohexanecarboxylate, diglycidyl 1,2-cyclohexanedicarboxylate, 2-(3,4-epoxycyclohexyl-5,5-spiro-3,4-epoxy)cyclohexane-meta-dioxane, bis(3,4-epoxycyclohexylmethyl) adipate, bis(3,4-epoxy-6-methylcyclohexylmethyl)adipate, 3,4-epoxy-6-methylcyclohexylmethyl-3',4'-epoxy-6'-methylcyclohexanecarboxylate, £-caprolactone-modified 3,4-epoxycyclohexyl methyl-3',4'-epoxycyclohexanecarboxylate, trimethylcaprolactone-modified 3,4-epoxycyclohexylmethyl-3',4'-epoxycyclohexanecarboxylate, β-methyl-δ-valerolactone-modified 3,4-epoxycyclohexylmethyl-3',4'-epoxycyclohexanecarboxylate, 1,4-cyclohexanedimethanol bis(3,4-epoxycyclohexane)carboxylate, ethyleneglycol di(3,4-epoxycyclohexylmethyl)ether, ethylene bis(3,4-epoxycyclohexanecarboxylate), 3,4-epoxycyclohexyl methyl(meth) acrylate, 4-vinylcyclohexene dioxide, vinylcyclohexene monoxide, or the like, or a combination thereof.

Nonlimiting examples of the aromatic epoxy monomer may include: bisphenol epoxy resins such as bisphenol A diglycidyl ether, bisphenol F diglycidyl ether, and bisphenol S diglycidyl ether; novolac epoxy resins such as phenol novolac epoxy resins, cresol novolac epoxy resins, and hydroxybenzaldehyde phenol novolac epoxy resins; polyfunctional epoxy resins such as tetrahydroxyphenylmethane glycidyl ether, tetrahydroxybenzophenone glycidyl ether, and epoxidized polyvinyl phenol, or the like, or a combination thereof may be used.

The hydrogenated aromatic epoxy monomer refers to a monomer obtained through selective hydrogenation of an aromatic epoxy monomer in the presence of a catalyst under pressure. The aromatic epoxy monomer for the hydrogenated aromatic epoxy monomer may include the aromatic epoxy monomers set forth above.

Nonlimiting examples of the oxetane monomer may include 3-methyloxetane, 2-methyloxetane, 2-ethylhexyloxetane, 3-oxetanol, 2-methyleneoxetane, 3,3-oxetanedimethanethiol, 4-(3-methyloxetan-3-yl)benzonitrile, N-(2,2-dimethylpropyl)-3-methyl-3-oxetane methaneamine, N-(1,2-dimethylbutyl)-3-methyl-3-oxetane methaneamine, (3-ethyloxetan-3-yl)methyl(meth)acrylate, 4-[(3-ethyloxetan-3-yl)methoxy]butan-1-ol, 3-ethyl-3-hydroxymethyloxetane, xylene bis-oxetane, 3-[ethyl-3[[(3-ethyloxetane-3-yl] methoxy]methyl]oxetane, or a combination thereof may be used.

The cross-linking agent may be present in an amount of about 0.1 parts by weight to about 50 parts by weight, for example about 1 part by weight to about 30 parts by weight, or about 5 parts by weight to about 15 parts by weight, based on 100 parts by weight of the siloxane copolymer represented by the compound of Chemical Formulae 1 to 3. Within these ranges, the cross-linking agent may improve the flexibility and hardness of the flexible plastic substrate.

The siloxane copolymer represented by Chemical Formula 1 may be prepared by a hydrolysis and condensation polymerization reaction of a compound represented by Chemical Formula 1-A and a compound represented by Chemical Formula 1-B:

  Chemical Formula 1-A

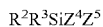  Chemical Formula 1-B wherein, in Chemical Formulae 1-A and 1-B, $R^1$ to $R^3$ are each the same as defined in Chemical Formula 1, $Z^1$ to $Z^6$ are each independently a C1 to C6 alkoxy group, a hydroxy group, a halogen, a carboxy group, or a combination thereof. The siloxane copolymer represented by Chemical Formula 2 may be prepared by a hydrolysis and condensation polymerization reaction of a compound represented by Chemical Formula 1-A and a compound represented by Chemical Formula 1-C:

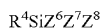  Chemical Formula 1-C

In Chemical Formula 1-C, $R^4$ is the same as defined in Chemical Formula 2, and $Z^6$ to $Z^8$ are each independently a C1 to C6 alkoxy group, a hydroxy group, a halogen, a carboxy group, or a combination thereof.

The siloxane copolymer represented by Chemical Formula 3 may be prepared by a hydrolysis and condensation polymerization reaction of a compound represented by Chemical Formula 1-A, a compound represented by Chemical Formula 1-B, and a compound represented by Chemical Formula 1-C.

The hydrolysis and condensation polymerization reaction of the silane compounds represented by Chemical Formulae 1-A, 1-B, and 1-C may be performed by any suitable method, including those known to those of ordinary skill in the art. For example, a solvent, water, and if necessary, a catalyst are added to a mixture of the silane compounds represented by Chemical Formulae 1-A, 1-B, and 1-C, and the obtained mixture is stirred at about 50° C. to about 150° C., for example, about 90° C. to about 130° C. for about 0.5 hours to about 100 hours. In addition, during the stirring, a hydrolysis by-product (alcohol, such as methanol or the like) or a condensation by-product may be removed through distillation if needed. The catalyst, which is added if necessary, has no particular limit but may be an acid catalyst, a base catalyst, or the like.

In the flexible plastic substrate according to an embodiment, the poly(amide-imide) copolymer film may have a thickness of about 10 micrometers (μm) to about 200 μm, for example, about 20 μm to about 150 μm, for example, about 20 μm to about 100 μm, for example, about 30 μm to about 100 μm, for example, about 50 μm to about 100 μm, for example, about 70 μm to about 100 μm, for example, about 80 μm to about 90 μm, and the hard coating layer may have a thickness of about 2 μm to about 50 μm, for example, about 3 μm to about 30 μm, for example, about 5 μm to about 30 μm, for example, about 5 μm to about 20 μm, for example, about 7 μm to about 20 μm, for example, about 10 μm to about 20 μm, for example, about 10 μm to about 15 μm, for example, about 15 μm to about 20 μm, or for example, about 15 μm, wherein the flexible plastic substrate may have film surface pencil hardness of greater than or equal to about 2H, for example, greater than or equal to about 3H, and for example, greater than or equal to about 4H, as measured under a vertical load of 1 kg according to ASTM D3363, and, simultaneously, a film yellow index (YI) of less than or equal to about 5, for example, less than or equal to about 4, for example, less than or equal to about 3, for example, less than or equal to about 2.5, for example, less than or equal to about 2, for example, less than or equal to about 1.5, for example, less than or equal to about 1, as measured according to ASTM E313, and a total light transmittance of greater than or equal to about 89%, for example, greater than or equal to about 89.5%, for example, greater than or equal to about 89.6%, for example, greater than or equal to about 89.7%, for example, greater than or equal to about 89.8%, for example, greater than or equal to about 89.9%, for example, greater than or equal to about 90%, in a wavelength region of 350 nm to 750 nm. When the flexible plastic substrate has these properties, a final window may show strong scratch resistance and transparency.

The hard coating layer may further include a nanoparticle. When the hard coating layer further includes the nanoparticle, hardness of the flexible plastic substrate may further be increased. Usable nanoparticles may be silica, titania, barium titanate, zirconia, barium sulfate, alumina, hafnium oxide, or a combination thereof, but is not limited thereto. The nanoparticle may be dispersed in the crosslinked siloxane copolymer of the hard coating layer, or chemically bound to the crosslinked siloxane copolymer. The nanoparticle may have an average particle diameter (D50) of about 1 nm to about 200 nm, for example, about 10 nm to about 50 nm. Within the range, hardness of the flexible plastic substrate may be increased without having an adverse effect on surface roughness and transparency thereof. The nanoparticle may be included in an amount of about 0.1 parts by weight to about 60 parts by weight, for example, about 10 parts by weight to about 50 parts by weight, based on 100 parts by weight of the crosslinked siloxane copolymer represented by one of Chemical Formulae 1 to 3. Within the range, the hardness of the flexible plastic substrate may be increased without having an adverse effect on surface roughness and transparency thereof.

The nanoparticle may be, for example, a nanoparticle in a sol state (hereinafter, referred to as 'nanosol'). The nanosol may have a reaction site on the surface of the nanoparticle, for example, at least one of a hydroxy group, an alkoxy group, a halogen, a carboxy group, or a combination thereof that is capable of participating in a condensation reaction.

When the nanosol is also included in the hydrolysis and condensation polymerization reaction of the silane compounds represented by Chemical Formulae 1-A, 1-B, and 1-C to prepare the siloxane copolymer, the silane compounds themselves can undergo the hydrolysis condensation polymerization reaction, and, simultaneously, join with the condensation reaction sites of the nanosol, and thus the nanosol may be bonded into a main chain of the siloxane copolymer having the cross-linkable functional group and/or form a cross-linking bond among chains of the siloxane copolymer. Accordingly, the siloxane copolymer having the cross-linkable functional group may form a nanoparticle-polysiloxane composite having a three dimensional network structure through a chemical bond between the siloxane copolymer and the nanoparticle, and the crosslinked siloxane copolymer of the hard coating layer formed from the nanoparticle-polysiloxane composite may show higher mechanical properties due to the inorganic nanoparticle.

In an embodiment, the hard coating layer may further include a colorant, for example a blue or violet colored pigment, having a maximum visible absorption peak at a wavelength of greater than or equal to 570 nm.

The polyimide or poly(imide-amide) copolymer has high light transmittance, thermal stability, mechanical strength, flexibility, or the like, and thus, may be useful as a display substrate material. In general, a display device is manufactured through a high temperature process at a temperature of greater than or equal to about 350° C., such as a high temperature deposition, a high temperature annealing, and the like. The treatment at a high temperature of greater than or equal to a glass transition temperature rearranges polyimide or poly(imide-amide) molecules, which may lead to packing of the polymer chains. Herein, the polyimide or poly(imide-amide) copolymer has a structure called a "charge transfer complex (CTC)", in which an electron donor and an electron acceptor are adjacent each other, and thus, a polyimide or poly(imide-amide) film absorbs light in a particular short wavelength region due to an electron movement (excitation) between potentials formed due to the CTC structure. Accordingly, as transmittance in a visible blue region at a wavelength of less than or equal to about 430 nm, which is desirable for manufacturing a display, is remarkably deteriorated, the film can become yellow. This is called 'yellowing phenomenon' occurring due to the high temperature heat treatment, which makes it difficult to use the polyimide or poly(imide-amide) copolymer film in manufacturing a transparent device, which necessarily requires a high temperature process.

In an embodiment, the hard coating layer further includes a colorant, for example a blue or violet dye or pigment, having a maximum visible absorption at a wavelength of greater than or equal to 570 nm and thus may effectively increase optical properties, for example, a yellow index of the poly(amide-imide) copolymer film without deteriorating its mechanical properties.

The colorant having a maximum visible absorption at a wavelength of greater than or equal to 570 nm may be any suitable dye or pigment having a maximum visible absorption at a wavelength of greater than or equal to 570 nm without a particular limit. For example, the dye or pigment may be a violet dye or pigment having a maximum visible absorption peak at a wavelength of greater than or equal to 570 nm or a blue dye or pigment having a maximum absorption peak at less than 400 nm and a maximum visible absorption peak at a wavelength of greater than or equal to 570 nm.

For example, the blue-based dye or pigment may include a metal phthalocyanine-based pigment, an indanthrone-based pigment, an indophenol-based pigment, or the like, and may be, for example, a phthalocyanine metal complex such as copper phthalocyanine, or chloro copper phthalocyanine, chloro aluminum phthalocyanine, titanyl phthalocyanine, vanadic acid phthalocyanine, magnesium phthalocyanine, zinc phthalocyanine, iron phthalocyanine, cobalt phthalocyanine, or the like.

For example, the violet pigment may include dioxazine violet, first violet B, methyl violet, indanthrene brilliant violet, or the like, and the violet-based pigment may be, for example, dioxazine violet, but is not limited thereto.

The dye or pigment having a maximum absorption wavelength at greater than or equal to 570 nm in the visible ray region may be included in an amount of less than or equal to about 100 parts per million (ppm), for example, less than or equal to about 90 ppm, for example, less than or equal to about 80 ppm, for example, less than or equal to about 70 ppm, for example, less than or equal to about 60 ppm, and for example, less than or equal to about 50 ppm, based on a weight of the crosslinked siloxane copolymer forming the hard coating layer. When the blue or violet dye or pigment is included within the above range based on the weight of the siloxane copolymer forming the hard coating layer, the yellow index (YI) of the poly(amide-imide) copolymer film may be adjusted or improved, while other properties of the poly(amide-imide) copolymer film, for example, mechanical properties such as a tensile modulus and pencil (surface) hardness are maintained as they are. For example, the yellow index of the flexible plastic substrate may be adjusted by controlling a concentration of a blue or violet colored dye or pigment within the content range. For example, as shown in the Examples, when a flexible plastic substrate is manufactured by adding about 30 ppm to about 60 ppm of copper phthalocyanine as the blue pigment or dioxazine violet as the violet pigment based on the total weight of the crosslinked siloxane copolymer forming the hard coating layer, a yellow index (YI) of the flexible plastic substrate is reduced down to less than or equal to about 3, for example, less than or equal to about 2.5, for example, less than or equal to about 2, for example, less than or equal to about 1.5, for example, less than or equal to about 1, which is greater than or equal to about by 50% less than a yellow index (YI) of a flexible plastic substrate not including these pigments, when measured according to ASTM E313.

In another embodiment, the poly(amide-imide) copolymer film of the flexible plastic substrate may include a poly(amide-imide) copolymer widely used in a related art. For example, the poly(amide-imide) copolymer may be prepared by using an aromatic dianhydride, an aromatic diamine, and a dicarboxylic acid derivative.

In an embodiment, the poly(amide-imide) copolymer may be a reaction product prepared by reacting a tetracarboxylic acid dianhydride represented by Chemical Formula 6, a diamine represented by Chemical Formula 7, and a dicarboxylic acid derivative represented by Chemical Formula 9:

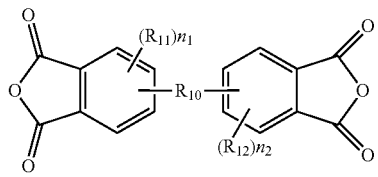

Chemical Formula 6

In Chemical Formula 6, $R^{10}$ is a single bond, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$—, —(CF$_2$)$_q$—, —(CF$_2$)$_q$— (wherein, 1≤q≤10), —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$—, or —C(=O)NH— group, wherein 1≤n≤10, 1≤p≤10 and 1≤q≤10, $R^{11}$ and $R^{12}$ are each the same or different and are independently a halogen, a hydroxy group, a substituted or unsubstituted C1 to C10 aliphatic group, a substituted or unsubstituted C6 to C20 aromatic group, a group of the formula —OR$^{201}$ wherein R$^{201}$ is a C1 to C10 aliphatic group, or a group of the formula —SiR$^{210}$R$^{211}$R$^{212}$ wherein R$^{210}$, R$^{211}$ and R$^{212}$ are each the same or different and are independently hydrogen or a C1 to C10 aliphatic group, and n1 and n2 are each the same or different and are independently an integer of 0 to 3.

$$NH_2-R^{13}-NH_2 \qquad \text{Chemical Formula 7}$$

In Chemical Formula 7, $R^{13}$ is represented by Chemical Formula 8:

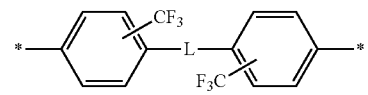

Chemical Formula 8 wherein, in Chemical Formula 8, L is a single bond, —CONH—, -Ph-CONH-Ph-, or —NHCO-Ph-CONH—, wherein Ph is a substituted or unsubstituted phenylene group each linked to adjacent groups in an ortho, meta, or para configuration, and * is a point linked to nitrogen of an amino group.

$$X^1-CO-R^{14}-CO-X^2 \qquad \text{Chemical Formula 9}$$

wherein, in Chemical Formula 9, $X^1$ and $X^2$ are each independently the same or different halogen, and $R^{14}$ is a phenylene group or a biphenylene group.

The tetracarboxylic acid dianhydride represented by Chemical Formula 6 may be further represented by at least one of Chemical Formula 10 and Chemical Formula 11, the diamine represented by Chemical Formula 7 may be 2,2'-bis(trifluoromethyl)benzidine (TFDB), and the dicarboxylic acid derivative represented by Chemical Formula 9 may be terephthaloyl chloride (TPCl):

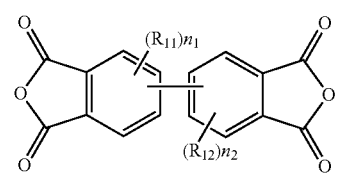

Chemical Formula 10

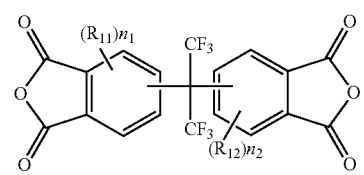

Chemical Formula 11 wherein, in Chemical Formula 10 and Chemical Formula 11, $R^{11}$, $R^{12}$, n1, and n2 are each the same as defined in Chemical Formula 6.

The poly(amide-imide) copolymer may be prepared by reacting TFDB, a tetracarboxylic acid dianhydride represented by at least one of Chemical Formula 10 and Chemical Formula 11, and TPCl in a mole ratio of about 1:(0.1 to 0.5):(0.5 to 0.9). As used herein, the mole ratio is a ratio of the number of moles of the diamine to the number of moles of the tetracarboxylic acid dianhydride(s) to the number of moles of the dicarboxylic acid.

In an embodiment, TFDB, a tetracarboxylic acid dianhydride represented by at least one of Chemical Formulae 10 and 11, and TPCl may be reacted in a mole ratio of about 1:(0.1 to 0.4):(0.6 to 0.9), for example, about 1:(0.1 to 0.3):(0.7 to 0.9), and for example, about 1:(0.2 to 0.3):(0.7 to 0.8). A poly(amide-imide) copolymer prepared by reacting TFDB, a tetracarboxylic acid dianhydride represented by at least one of Chemical Formulae 9 and 10, and TPCl within the above ranges may show excellent optical properties and high mechanical properties.

The poly(amide-imide) copolymer may be prepared by any suitable method of reacting a dicarboxylic acid derivative, such as a dicarboxylic acid chloride with a diamine to from an amide structural unit, adding additional diamine and tetracarboxylic acid dianhydride thereto to generate an amic acid structural unit by the diamine and the tetracarboxylic acid dianhydride, and simultaneously, linking the amide structural unit with the amic acid structural unit to resultantly form the poly(amic acid-imide) copolymer. This poly(amic acid-imide) copolymer may optionally be further chemically or thermally imidized, and then may be cast on a substrate or the like to form a film and heat-treated to obtain a final poly(amide-imide) copolymer film.

Another method of preparing a poly(amide-imide) copolymer includes first preparing an oligomer including an amide group and having an amino group at both terminal ends (hereinafter, referred to as an 'amide group-containing oligomer') by reacting a diamine compound and a dicarboxylic acid derivative forming an amide structural unit, and then reacting the oligomer as a diamine monomer with a tetracarboxylic acid dianhydride compound. This manufacturing method of the poly(amide-imide) copolymer may need no precipitation for removing halogenated hydrogen salt used in the aforementioned poly(amide-imide) copolymer manufacturing method, and thus may reduce an entire process time and cost and also increase a final yield of the poly(amide-imide) copolymer. In addition, this poly(imide-amide) copolymer manufacturing method has an effect of increasing an amount of the amide structural unit in the copolymer.

The poly(amide-imide) copolymer film in the flexible plastic substrate according to an embodiment may be formed by either of the above two methods, but in any suitable method, including those known in the art, may be use without a particular limit.

Referring now to FIG. 1, the flexible plastic substrate 10 according to an embodiment may have much higher mechanical characteristic and excellent optical properties and flexural characteristics by disposing the hard coating layer 200 on a first surface of the poly(amide-imide) copolymer film 100, and thus may be used as a window film such as a display device, or the like. For example, the flexible plastic substrate 10 according to an example embodiment does not have a visible change in appearance, when observed by the naked eye, upon being subject to the repetitive flexural (bending) tests of inner bending or outer bending mode around a 3 millimeter (mm) radius of curvature (3R) greater than or equal to 100,000 times, for example, greater than or equal to 150,000 times, for example, greater than or equal to 200,000 times, at room temperature, i.e., at 25° C. Further, even after being subjected to the flexural test at a high temperature (e.g., greater than 40° C.) and high relative humidity (e.g., greater than 60%) conditions, there is no change observed by naked eye after performing the bending test for greater than or equal to 50,000 times, for example greater than or equal to 100,000 times. That is, the flexible plastic substrate 10 according to an embodiment has good flexibility resistance upon repetitive flexural tests.

Figure 2:
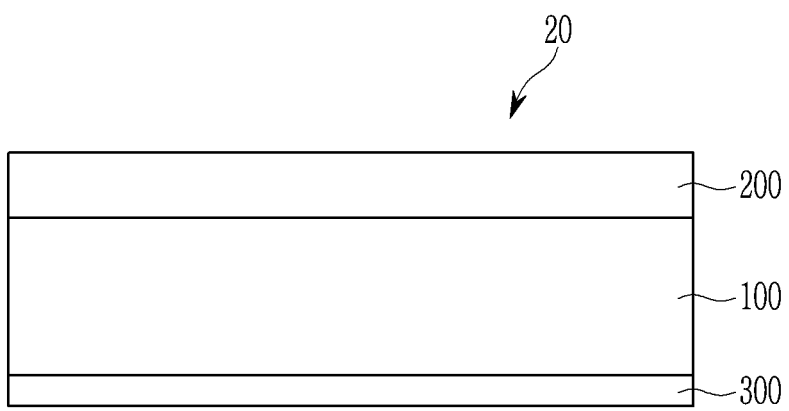
FIG. 2 is a schematic view showing a cross-section of a flexible plastic substrate according to another embodiment.

Next, referring to FIG. 2, a plastic substrate 20 according to another embodiment is described.

FIG. 2 is a schematic view showing a cross-section of the flexible plastic substrate 20 according to another embodiment, and the plastic substrate 20 includes the hard coating layer 200 on a first surface of the poly(amide-imide) copolymer film 100 and a rear coating layer 300 disposed on a second surface thereof opposite from the first surface on which the hard coating layer 200 is disposed, as shown with reference to FIG. 1.

The hard coating layer 200 has the same composition as described and illustrated with reference to FIG. 1.

The rear coating layer 300 may include any suitable material, if it is optically colorless and transparent and well adhered to a lower PSA (Pressure Sensitive Adhesive) adhesive layer and maintains flexural characteristics. For example, the rear coating layer 300 may include the same material as the hard coating layer 200, and may include a material, including those known in the art, used for a hard coating layer of a protective window for a display device.

For example, the rear coating layer 300 may include a (meth)acrylate polymer, polycaprolactone, a urethane-acrylate copolymer, polyrotaxane, an epoxy resin, a cross-linked or uncross-linked siloxane copolymer, perfluoropolyether, or a combination thereof.

The rear coating layer 300 may have a thickness of about 30 nm to about 300 nm, for example, about 40 nm to about 300 nm, for example, about 50 nm to about 250 nm, for example, about 50 nm to about 200 nm, for example, about 70 nm to about 200 nm, for example, about 80 nm to about 200 nm, for example, about 90 nm to about 180 nm, for example, about 90 nm to about 160 nm, and for example, about 100 nm to about 160 nm, and be relatively thinner than the hard coating layer 200.

The rear coating layer 300 may have a refractive index of less than or equal to about 1.7, for example, less than or equal to about 1.6, for example, less than or equal to about 1.5, for example, less than or equal to about 1.4, and for example, less than or equal to about 1.3.

The rear coating layer 300 may also further include a colorant, for example a blue or violet-colored dye or pigment, having a maximum visible absorption peak in a wavelength region of greater than or equal to 570 nm.

The blue or violet dye or pigment having a maximum visible absorption peak in a wavelength region of greater than or equal to 570 nm and may be the same as aforementioned.

The rear coating layer 300 may include the, colorant, for example the blue or violet-colored dye or pigment, having a maximum visible absorption peak in a wavelength region of greater than or equal to 570 nm in an amount of less than or equal to about 100 ppm, for example, less than or equal to about 90 ppm, for example, 80 ppm, for example, less than or equal to about 70 ppm, for example, less than or equal to about 60 ppm, and for example, less than or equal to about 50 ppm, based on the weight of the rear coating layer 300. The colorant may be included independently within the above range in each of the hard coating layer 200 and the rear coating layer 300.

The rear coating layer 300 may further include a nanoparticle, as in the hard coating layer 200. When the rear coating layer 300 further includes the nanoparticle, hardness of the flexible plastic substrate may further increase. Usable nanoparticles may be inorganic oxides, such as, silica, titania, barium titanate, zirconia, barium sulfate, alumina, hafnium oxide, a combination thereof, or the like, but is not limited thereto. The nanoparticle may be dispersed in a copolymer of the rear coating layer, or chemically bound to the copolymer of the rear coating layer. The nanoparticle may have an average particle diameter (D50) of about 1 nm to about 200 nm, for example, about 10 nm to about 50 nm. Within the range, the hardness of the flexible plastic substrate may be increased without having an adverse effect on surface roughness and transparency thereof. The nanoparticle may be included in an amount of about 0.1 parts by weight to about 60 parts by weight, for example, about 10 parts by weight to about 50 parts by weight based on 100 parts by weight of the rear coating layer. Within the range, the hardness of the flexible plastic substrate may be increased without having an adverse effect on surface roughness and transparency thereof.

Referring back to FIG. 2, the flexible plastic substrate 20 including both the hard coating layer 200 and the rear coating layer 300 may further improve the mechanical properties and optical properties of the poly(amide-imide) copolymer film 100 and may provide appropriate mechanical properties and optical properties for a window for a display device film and particularly, for a flexible window for a display device film.

The flexible plastic substrate 10 shown in FIG. 1 may be manufactured by forming the hard coating layer 200 by coating a siloxane copolymer having a cross-linkable functional group or a solution including the same on a first surface of the poly(amide-imide) copolymer film 100 and curing it. The coating of the siloxane copolymer having a cross-linkable functional group or the solution including the same on the first surface of the poly(amide-imide) copolymer film 100 has no particular limit. For example, the coating may include bar coating, spin coating, dip coating, roll coating, flow coating, die coating, or the like. The siloxane copolymer having a cross-linkable functional group for a hard coating layer or the solution including the same may be coated to be about 2 μm to about 100 μm thick on the poly(amide-imide) copolymer film 100. By coating the solution within the range and curing, a desired coating layer having a thickness of about 2 μm to about 50 μm, for example, of about 3 μm to about 30 μm, for example, of about 5 μm to about 30 μm, for example, of about 5 μm to about 20 μm, for example, of about 7 μm to about 20 μm, for example, of about 10 μm to about 20 μm, and for example, of about 15 μm, may be secured, and thus the flexible plastic substrate 10 having excellent hardness, flexibility, and optical reliability may be provided.

The curing is performed to cure the siloxane copolymer to form a cured siloxane copolymer of the coating layer and may include at least one of photocuring and thermal curing. The photocuring may be performed by irradiating light at a wavelength of less than or equal to about 400 nm with a light dose of about 10 mJ/cm$^2$ to about 1000 mJ/cm$^2$. The thermal curing may include a heat treatment at about 40° C. to about 200° C. for about 1 hour to about 30 hours. Within the range, the siloxane copolymer for a hard coating layer may be sufficiently cured. For example, the thermal curing may be performed after the photocuring to further increase hardness of the coating layer.

The siloxane copolymer for a hard coating layer or the solution including the same may be additionally dried after coated but before cured on the poly(amide-imide) copolymer film 100. The drying before the curing may prevent surface roughness increase of the coating layer due to the photocuring and/or thermal curing for a long time. The drying may be performed at about 40° C. to about 200° C. for about 1 minute to about 30 hours, but is not limited thereto.

The flexible plastic substrate 20 shown in FIG. 2 may be manufactured by forming the hard coating layer 200 on a first surface of the poly(amide-imide) copolymer film 100 as in the aforementioned method, and the rear coating layer 300 on a second surface of the poly(amide-imide) copolymer film 100. The rear coating layer 300 may be formed in the aforementioned methods of bar coating, spin coating, dip coating, roll coating, flow coating, die coating, or the like on the surface opposite of the poly(amide-imide) copolymer film 100 (i.e., on which the hard coating layer is not formed). In addition, the rear coating layer 300 may be formed through drying and curing after the coating.

The flexible plastic substrates 10 and 20 have pencil (scratch) hardness of greater than or equal to about 2H, for example, of greater than or equal to about 3H, and for example, of greater than or equal to about 4H when measured with a vertical load of 1 kg according to ASTM D3363, total light transmittance of greater than or equal to about 89%, for example, greater than or equal to about 89.5%, for example, greater than or equal to about 89.6%, for example, greater than or equal to about 89.7%, for example, greater than or equal to about 89.8%, for example, greater than or equal to about 89.9%, and for example, greater than or equal to about 90% within a wavelength range of about 350 nm to about 750 nm, and flexural characteristics. In addition, the plastic substrate may have a yellow index (YI) of less than or equal to about 3, for example, less than or equal to about 2.5, for example, less than or equal to about 2.0, for example, less than or equal to about 1.5, and for example, less than or equal to about 1, and flexural properties as described above.

Even though not shown in FIGS. 1 and 2, the flexible plastic substrates 10 and 20 may further include additional layers such as an anti-reflection layer, an antistatic layer, or the like on the hard coating layer 200, and additionally an adhesion layer or the like on the rear coating layer 300 to adhere the flexible plastic substrates 10 and 20 to a display member, a touch screen panel, a polarizer, or the like.

Hereafter, one or more embodiments of this disclosure are described in additional detail with reference to examples. The following examples and comparative examples are not restrictive, but are illustrative.

EXAMPLES

Synthesis Example 1: Preparation of Amide Group-Containing Oligomer 1 molar equivalent (0.122 mol, 39.2 g) of 2,2'-bis(trifluoromethyl)benzidine (TFDB) and 2.8 molar equivalents (0.343 mol, 27.11 g) of pyridine are dissolved in 700 g of N,N-dimethylacetamide (DMAC) as a solvent in a round-bottomed flask, and then 50 ml of DMAC is additionally added thereto to dissolve the TFDB remaining there. 0.7 molar equivalents (0.086 mol, 17.4 g) of TPCl (terephthaloyl dichloride) are divided in four aliquots and each is separately added to the TFDB solution at 25° C. Then, the mixture is further stirred for 15 minutes.

The resulting solution is stirred under a nitrogen atmosphere for 2 hours, and 7 L of NaCl containing 350 g of NaCl is added thereto, and the obtained mixture is stirred for 10 minutes. A solid produced therein is filtered and then twice resuspended, and refiltered with 5 L of deionized water. A final filtrate on a filter is appropriately compressed to remove most remaining water, and the filtrate is then dried at 90° C. under vacuum for 48 hours to obtain an amide group-containing oligomer represented by Chemical Formula 12. A number average molecular weight (Mn) of the amide group-containing oligomer is about 997 g/mol, as determined by GPC.

sphere until the oligomer is completely dissolved, 3.494 g (0.0079 mol) of 6FDA (2,2-bis-(3,4-dicarboxyphenyl) hexafluoropropane dianhydride) and 2.314 g (0.0079 mol) of BPDA (3,3',4,4'-biphenyltetracarboxylic dianhydride) are slowly added to the solution in which the oligomer is dissolved. 10 ml of dimethyl acetamide (DMAc) is further added thereto, and the mixture is stirred for 48 hours to

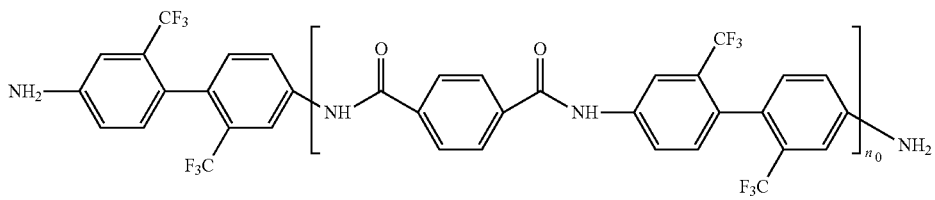

Chemical Formula 12

In Chemical Formula 12, no is an integer of greater than or equal to 1.

Synthesis Example 2: Poly(Amide-Imide) Copolymer Film Including 70 mol % of Amide Group 21.6 g (0.0157 mol) of the amide group-containing oligomer according to Synthesis Example 1 is put in a 250 ml 4-necked double walled reactor equipped with a mechanical agitator and a nitrogen inlet, and preheated at 30° C., and 143 ml of dimethyl acetamide (DMAc) is added thereto. The solution is stirred at 30° C. under a nitrogen atmosphere until the oligomer is completely dissolved, and then 3.494 g (0.0079 mol) of 6FDA (2,2-bis-(3,4-dicarboxyphenyl) hexafluoropropane dianhydride)) and 2.314 g (0.0079 mol) of BPDA (3,3',4,4'-biphenyltetracarboxylic dianhydride) are slowly added to the solution in which the oligomer is dissolved. 10 ml of dimethyl acetamide (DMAc) is further added thereto, and the obtained mixture is stirred for 48 hours to obtain a poly(amic acid-amide) solution having a solids concentration of 16% by weight.

The poly(amic acid-amide) solution is cooled to 25° C., 4.818 g of acetic anhydride is added thereto, the mixture is stirred for 30 minutes, 3.733 g of pyridine is added thereto, and the obtained mixture is further stirred for 48 hours to obtain a poly(imide-amide) copolymer solution.

The poly(amide-imide) copolymer solution is coated on a glass plate to cast a film. The film is dried on an 80° C. hot plate, heat-treated along with the glass plate up to 250° C. in an oven at 3° C./min in an oven, cooled down, and peeled off from the glass plate to obtain an about 80 μm-thick poly(amide-imide) film.

The film has a total light transmittance of about 88.3% in a wavelength range of 350 nm to 750 nm, and a yellow index (YI) of about 3.2 when measured with a reference to a 50 μm-thick film according to ASTM E313.

Synthesis Example 3: Silica Nanoparticle-Containing Poly(Amide-Imide) Copolymer Film 21.6 g (0.0157 mol) of the amide group-containing oligomer according to Synthesis Example 1 is put in a 250 ml 4-necked double walled reactor equipped with a mechanical agitator and a nitrogen inlet and preheated at 30° C., and 143 ml of dimethyl acetamide (DMAc) is added thereto. The mixed solution is stirred at 30° C. under a nitrogen atmoobtain a poly(amic acid-amide) solution having a solids concentration of 16% by weight.

In a separate reaction, 0.03 g of non-crystalline silica particles having an average diameter of 10 nanometers and having OH group bonded on the surface thereof are added in a dispersant concentration of 0.1 wt % to N,N-dimethyl acetamide (DMAc), and then ultrasonicated until the solvent becomes transparent to obtain a silica particle suspension, the silica particle suspension is added to the poly(amic acid-amide) solution in a final silica concentration of 1,000 ppm, based on the total solid content of the solution.

This mixed solution of the poly(amic acid-amide) copolymer and the silica particle suspension is coated on a glass plate to cast a film. After drying the film on an 80° C. hot plate for one hour, the glass plate having the film is heat-treated up to 250° C. at 3° C./min in an oven and slowly cooled down, and the film is finally peeled off from the glass plate to obtain an about 80 μm-thick poly(amide-imide) film in which the silica nanoparticle is dispersed.

The silica nanoparticle-containing poly(amide-imide) copolymer film has a total light transmittance of about 88% in a wavelength range of 350 nm to 750 nm and a yellow index (YI) of about 3.2 when measured with a reference to a 50 μm-thick film according to ASTM E313.

Synthesis Example 4: Organosiloxane Copolymer for Hard Coating Layer Having Cross-Linkable Functional Group 50 g of monomer mixture of 98 mol % of 2-(3,4-epoxycyclohexyl)ethyltriethoxysilane (Sigma-Aldrich Co., Ltd.), 1 mol % of 2-(3,4-epoxycyclohexyl)ethylmethyldiethoxysilane (Gelest Inc.), 1 mol % of 2-hydroxy-4-(3-triethoxysilylpropoxy)diphenylketone (Gelest Inc.) is put in a 200 ml 2-necked flask. 2 mol % of KOH and 1 mol % of water based on the total moles of the monomer mixture are added thereto, and the obtained mixture is stirred at 65° C. for 4 hours. A solvent remaining therein is removed with a vacuum distillation unit to prepare an organosiloxane copolymer, and methylethylketone is added thereto to have a solids content of 90 wt %. A weight average molecular weight of the organosiloxane copolymer is 6,200 g/mol when examined through gel permeation chromatography.

5 parts by weight of Irgacure-250 (BASF Corp.) as an initiator is added to 100 parts by weight of the organosiloxane copolymer to prepare a composition for a hard coating layer.

Synthesis Example 5: Organosiloxane Copolymer Having Cross-Linkable Functional Group for Hard Coating Layer 50 g of a monomer mixture including 98 mol % of 2-(3,4-epoxycyclohexyl)ethyltriethoxysilane (Sigma-Aldrich Co., Ltd.), 1 mol % of 2-(3,4-epoxycyclohexyl)ethylmethyldiethoxysilane (Gelest Inc.), and 1 mol % of 2-hydroxy-4-(3-triethoxysilylpropoxy)diphenylketone (Gelest Inc.) is put in a 200 ml 2-necked flask. 2 mol % of KOH and 1 mol % of water based on the total amount of the monomer mixture are added thereto, and the mixture is stirred at 65° C. for 4 hours. An organosiloxane copolymer is obtained by removing water and alcohol remaining there with a vacuum distillation unit, and methylethylketone is added thereto until a solids content reaches 90 wt %. A weight average molecular weight of the organosiloxane copolymer is 6,200 g/mol when examined through gel permeation chromatography.

100 parts by weight of the organosiloxane copolymer is added to 10 parts by weight of a cross-linking agent, CY-179 (CIBA Specialty Chemicals Inc.) and 5 parts by weight of an initiator, Irgacure-250 (BASF Corp.) to prepare a composition for a hard coating layer.

Example 1: Flexible Plastic Substrate Having Hard Coating Layer

The composition for a hard coating layer according to Synthesis Example 5 is coated on one surface of the poly(amide-imide) copolymer film (a thickness: 80 μm) according to Synthesis Example 2, pre-annealed at 90° C. for 2 minutes, and irradiated with a 200 W high pressure mercury lamp having a wavelength region of 240 nm to 400 nm for 96 seconds. Then, the composition is post-annealed at 200° C. for 1 hour to obtain a flexible plastic substrate having an about 10 μm-thick hard coating layer.

Example 2: Flexible Plastic Substrate Having Both Hard and Rear Coating Layers The composition for a hard coating layer according to Synthesis Example 5 is bar-coated on one surface of the poly(amide-imide) copolymer film (a thickness: 80 μm) according to Synthesis Example 2, pre-annealed at 90° C. for 2 minutes, and irradiated by a 200 W high pressure mercury lamp having a wavelength region of 240 nm to 400 nm for 96 seconds. Then, the composition is post-annealed at 200° C. for 1 hour to form an about 10 μm-thick hard coating layer.

Subsequently, the composition for a hard coating layer according to Synthesis Example 4 is formed to be about 100 nm thick on the other side of the poly(amide-imide) copolymer film on which the hard coating layer is not formed, pre-annealed at 90° C. for 2 minutes, and irradiated by a 200 W high pressure mercury lamp having a wavelength region of 240 nm to 400 nm for 96 seconds to form an about 90 nm-thick rear coating layer and thus obtain a flexible plastic substrate having both the hard coating layer and the rear coating layer.

Example 3: Flexible Plastic Substrate Having Hard Coating Layer and Rear Coating Layer Including Violet Pigment The composition for a hard coating layer according to Synthesis Example 5 is bar-coated on one surface of the poly(amide-imide) copolymer film (a thickness: 80 μm) according to Synthesis Example 2, pre-annealed at 90° C. for 2 minutes, and irradiated by a 200 W high pressure mercury lamp having a wavelength region of 240 nm to 400 nm for 96 seconds. Then, the composition is post-annealed at 200° C. for 1 hour to form an about 10 μm-thick hard coating layer.

Then, about 34 ppm of dioxazine violet (Violet Pigment, MVC, Iridos Co., Ltd.) is added to the composition for a hard coating layer according to Synthesis Example 4 based on a weight of an organosiloxane copolymer solid therein, the mixture is stirred for about 30 minutes with an agitator to obtain a rear coating solution including a violet pigment, and then, the solution is spin-coated to be about 200 nm thick on the other surface of the poly(amide-imide) copolymer film on which the hard coating layer is not formed, pre-annealed at 90° C. for 2 minutes, and irradiated by a 200 W high pressure mercury lamp having a wavelength region of 240 nm to 400 nm for 96 seconds to form an about 150 nm-thick rear coating layer to resultantly obtain a flexible plastic substrate having the hard coating layer and the rear coating layer including the violet pigment.

Example 4: Flexible Plastic Substrate Having Hard Coating Layer and Rear Coating Layer Including Violet Pigment The composition for a hard coating layer according to Synthesis Example 5 is bar-coated on one surface of the poly(amide-imide) copolymer film (a thickness: 80 μm) according to Synthesis Example 2, pre-annealed at 90° C. for 2 minutes, and irradiated by a 200 W high pressure mercury lamp having a wavelength region of 240 nm to 400 nm for 96 seconds. Then, the composition is post-annealed at 200° C. for 1 hour to form an about 10 μm-thick hard coating layer.

Subsequently, about 34 ppm of dioxazine violet (Violet Pigment, MVC, Iridos Co., Ltd.) based on a weight of an organosiloxane copolymer solid is added to the composition for a hard coating layer according to Synthesis Example 4, the mixture is stirred with an agitator for about 30 minutes to prepare a rear coating solution including a violet pigment, and this solution is spin-coated to be about 100 nm thick on the other surface of the (amide-imide) copolymer film on which the hard coating layer is not formed, pre-annealed at 90° C. for 2 minutes, and irradiated by a 200 W high pressure mercury lamp having a wavelength region of 240 nm to 400 nm for 96 seconds to form a about 90 nm-thick rear coating layer and resultantly obtain a flexible plastic substrate having the hard coating layer and the rear coating layer including the violet pigment.

Comparative Example 1: Plastic Substrate Having Polysiloxane Rear Coating Layer on One Surface of Poly(Amide-Imide) Film 10 g of polysilazane having a structural unit represented by Chemical Formula 13 and a weight average molecular weight of 2,000 g/mol (20 wt % of OPTS25, Az Materials LLC.) is dissolved to be 10 wt % in 10 ml of dibutylether, the solution is wire-coated to be about 100 nm thick and dried at 80° C. to form a polysilazane film on one surface of the poly(amide-imide) copolymer film including a silica nanoparticle (a thickness: 50 μm) according to Synthesis Example 3 instead of the poly(amide-imide) copolymer film according to Synthesis Example 2. Then, the polysilazane film is allowed to stand at room temperature for about 5 minutes, and thermally cured at about 250° C. to obtain a plastic substrate having an about 90 nm-thick rear coating layer as the polysiloxane layer having a structural unit represented by Chemical Formula 14 on one surface of the poly(amide-imide) film.

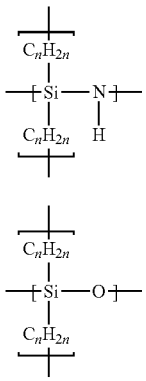

Chemical Formula 13

Chemical Formula 14

In Chemical Formulae 13 and 14, m and n are 1.

Comparative Example 2: Plastic Substrate Having Polyurethane-Based Hard Coating Layer on One Surface of Poly(Amide-Imide) Film and Polysiloxane Rear Coating Layer on Another Surface of the Poly(Amide-Imide) Film A solution prepared by dissolving 10 g of polyisocyanate including urethane having a structural unit represented by Chemical Formula 15 (55 wt % of KLS-009, Natoco Co., Ltd.) in 10 ml of PGMEA is bar-coated on one surface of the poly(amide-imide) copolymer film (a thickness: 50 μm) including a silica nanoparticle according to Synthesis Example 3 instead of the poly(amide-imide) copolymer film according to Synthesis Example 2, and dried at 80° C. Then, the composition is irradiated simultaneously at two wavelengths of 312 nm and 365 nm with energy of 100 mW/cm² for 10 seconds by using an ultraviolet (UV) light hardener to form an about 10 μm-thick hard coating layer.

Then, a plastic substrate having a polyurethane-based hard coating layer on one surface of a poly(amide-imide) film and a polysiloxane rear coating layer on the other surface thereof is obtained according to the same method as Comparative Example 1 by forming an about 90 nm-thick rear coating layer with polysiloxane having a structural unit represented by Chemical Formula 14 according to Comparative Example 1 on the other surface of the poly(amide-imide) copolymer film on which a hard coating layer is not formed.

Chemical Formula 15

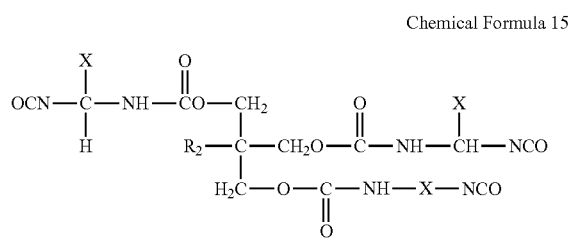

In Chemical Formula 15, X is represented by Chemical Formula 16:

Chemical Formula 16

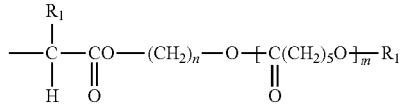

In Chemical Formula 16, $R_1$ and $R_2$ are each a hexyl group, and m and n are 1.

Comparative Example 3: Plastic Substrate Having Polyurethane-Based Hard Coating Layer on One Surface of Poly(Amide-Imide) Film and Polysiloxane Rear Coating Layer on Another Surface of the Poly(Amide-Imide) Film A 10 μm-thick hard coating layer is formed by bar-coating a solution obtained by dissolving 10 g of a urethane compound represented by Chemical Formula 17 (KLH-100, Natoco Co., Ltd.) in 10 g of methylethylketone (MEK) on one surface of the poly(amide-imide) copolymer film including a silica nanoparticle (a thickness: 50 μm) according to Synthesis Example 3 instead of the poly(amide-imide) copolymer film according to Synthesis Example 2, and then drying it at 80° C., and then, two wavelengths of light of 312 nm and 365 nm are simultaneously irradiated with energy of 100 mW/cm² on the film for 10 seconds by using an ultraviolet (UV) light hardener.

Then, an about 90 nm-thick rear coating layer formed of the polysiloxane having a structural unit represented by Chemical Formula 14 according to Comparative Example 1 is formed according to the same method as Comparative Example 1 on the other surface of the poly(amide-imide) copolymer film on which the hard coating layer is not formed to resultantly obtain a plastic substrate having the polyurethane-based hard coating layer on one surface of the poly(amide-imide) film and the polysiloxane rear coating layer on the other surface thereof.

Chemical Formula 17

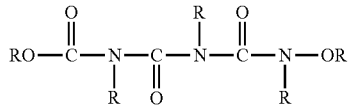

In Chemical Formula 17, R is a hexyl group.
Evaluation: Optical Properties and Flexural of Plastic Substrate of Examples and Comparative Examples Optical properties and flexural properties of the flexible plastic substrates according to Examples 1 to 4 and plastic substrates of Comparative Examples 1 to 3 are shown in Table 1. The characteristics are measured in the following methods.

(1) Film or Substrate Thickness

A thickness is measured by using a micrometer (Mitutoyo Corp.).

(2) Pencil Hardness

Pencil (surface) hardness is evaluated by using a pencil scratch hardness-measuring device, Model CT-PC2, produced by KOATECH LTD., and a Mitsubishi pencil, five times making a scratch under a vertical load of 1 kg at a speed of 60 mm/min, and examining the maximum pencil scratch hardness for visible scratching according to ASTM D3363.

(3) Transmittance and Yellow Index (YI)

YI is measured using a UV spectrophotometer (Konica Minolta Inc., cm-3600d) according to ASTM E313.

(4) Flexural Test

A flexural test of the films is conducted by using a flexibility measuring device (CFT-200, Cavotec SA) manufactured to set the films to have a curvature radius of 3 mm (3R) at a place where the films are supposed to be folded. The films for the test are cut to have a size of 20 cm (a width) and 10 cm (a length), and a pressure sensitive adhesive (PSA) (3160, 3M) is united with the rest of the films except for the middle part of about 2 cm where the films are folded. The part of the films not united with the PSA is positioned where the films are supposed to be folded and attached to a tester, and the flexural test is repeated 200,000 times. After the 200,000th flexural test, a film having no appearance change such as a crack on the surface or a slag is given as "PASS", while a film having the appearance change is given as "FAIL."

TABLE 1

| | Total Light Transmission (%) @(350 nm-750 nm) | YI | Flexural test (3R) | Pencil hardness |
|---|---|---|---|---|
| Example 1 | 89.8 | 3.14 | pass | 4H |
| Example 2 | 91.3 | 4.9 | pass | 4H |
| Example 3 | 90.7 | 1.9 | pass | 4H |
| Example 4 | 90.6 | 2.3 | pass | 4H |
| Comparative Example 1 | 91 | 1.5 | fail | 4H |
| Comparative Example 2 | 88 | 3.3 | fail | 4H |
| Comparative Example 3 | 88 | 3.0 | fail | 4H |

As shown in the results of Table 1, the flexible plastic substrates of Examples 1 to 4 all pass the flexural test, while the plastic substrate of Comparative Example 1 fails in the flexural test due to a bubble on the flexural surface even though the very thin polysiloxane rear coating layer alone is included on one surface of the poly(amide-imide) film.

In addition, the plastic substrates of Comparative Examples 2 and 3 including both hard coating layer and rear coating layer but not a crosslinked siloxane copolymer but a hard coating layer formed of an acrylate-based copolymer fail in the flexural test, since the flexural surface is broken as well as a bubble is generated on flexural surface.

In other words, a flexible plastic substrate having a hard coating layer formed by curing a siloxane copolymer having a cross-linkable functional group on one surface of a poly(amide-imide) copolymer film according to one embodiment has excellent flexural characteristics as well as maintains excellent mechanical characteristics and optical properties of the poly(amide-imide) copolymer film, and thus may be appropriately used as a protective window for a flexible display device.

In addition, the flexible plastic substrates including a small amount of a pigment in the rear coating layer along with the hard coating layer according to Examples 3 and 4 show remarkably improved YI.

While this disclosure has been described in connection with one or more embodiments, it is to be understood by those of ordinary skill in the art that various modifications in form, equivalent arrangements, and details may be made thereto without departing from the spirit and scope as defined by the following claims.

What is claimed is:

1. A flexible plastic substrate comprising
a film comprising a poly(amide-imide) copolymer; and
a hard coating layer disposed on a first surface of the film,
wherein the hard coating layer comprises a crosslinked siloxane copolymer wherein the crosslinked siloxane copolymer comprises a cured product of a siloxane copolymer represented by at least one of Chemical Formula 1, Chemical Formula 2, or Chemical Formula 3:

$$(R^1SiO_{3/2})_x(R^2R^3SiO_{2/2})_y \quad \text{Chemical Formula 1}$$

wherein, in Chemical Formula 1,
$R^1$ is a cross-linkable functional group or a hydrocarbyl group substituted with a cross-linkable functional group,
$R^2$ and $R^3$ are each independently hydrogen, a cross-linkable functional group, a hydrocarbyl group substituted with a cross-linkable functional group, a substituted or unsubstituted C1 to C20 alkyl group, or a substituted or unsubstituted C5 to C20 cycloalkyl group, provided that at least one of $R^2$ and $R^3$ is a substituted or unsubstituted C1 to C20 alkyl group, and
$0<x<1$, $0<y<1$, and $x+y=1$, $$(R^1SiO_{3/2})_x(R^4SiO_{3/2})_z \quad \text{Chemical Formula 2}$$

wherein, in Chemical Formula 2,
$R^1$ is a cross-linkable functional group or a hydrocarbyl group substituted with a cross-linkable functional group;
$R^4$ is an ultraviolet light absorbing functional group or a C1 to C20 hydrocarbyl group substituted with an ultraviolet light absorbing functional group; and
$0<x<1$, $0<z<1$, and $x+z=1$, $$(R^1SiO_{3/2})_x(R^2R^3SiO_{2/2})_y(R^4SiO_{3/2})_z \quad \text{Chemical Formula 3}$$

wherein in Chemical Formula 3,
$R^1$ is a cross-linkable functional group or a hydrocarbyl group substituted with a cross-linkable functional group;
$R^2$ and $R^3$ are each independently hydrogen, a cross-linkable functional group, a hydrocarbyl group substituted with a cross-linkable functional group, a substituted or unsubstituted C1 to C20 alkyl group, or a substituted or unsubstituted C5 to C20 cycloalkyl group, provided that at least one of $R^2$ and $R^3$ is a substituted or unsubstituted C1 to C20 alkyl group;
$R^4$ is an ultraviolet light absorbing functional group or a C1 to C20 hydrocarbyl group substituted with an ultraviolet light absorbing functional group; and
$0<x<1$, $0<y<1$, $0<z<1$, and $x+y+z=1$, and
wherein the flexible plastic substrate has
a pencil hardness of greater than or equal to 2H under a vertical load of 1 kilogram according to ASTM D3363,
a total light transmittance of greater than or equal to about 89% in a wavelength region of 350 nanometers to 750 nanometers.

2. The flexible plastic substrate of claim 1, wherein the cross-linkable functional group is a (meth)acrylate group, an epoxy group, an oxetanyl group, or a combination thereof.

3. The flexible plastic substrate of claim 1, wherein the ultraviolet light absorbing functional group is a substituted or unsubstituted benzotriazole group, a substituted or unsubstituted benzophenone group, a substituted or unsubstituted hydroxybenzophenone group, a substituted or unsubstituted triazine group, a substituted or unsubstituted salicylate group, a substituted or unsubstituted cyanoacrylate group, a substituted or unsubstituted oxanilide group, a substituted or unsubstituted hydroxyphenyltriazine group, a substituted or unsubstituted hydroxyphenylbenzotriazole group, a substituted or unsubstituted hydroxyphenylbenzophenone group, or a combination thereof.

4. The flexible plastic substrate of claim 1, wherein the siloxane copolymer represented by Chemical Formula 1 is further represented by at least one of Chemical Formulae 1-1 to 1-9:

$(EcSiO_{3/2})_x(EcMeSiO_{2/2})_y$   Chemical Formula 1-1

$(EcSiO_{3/2})_x((Me)_2SiO_{2/2})_y$   Chemical Formula 1-2

$(EcSiO_{3/2})_x(GpMeSiO_{2/2})_y$   Chemical Formula 1-3

$(GpSiO_{3/2})_x(EcMeSiO_{2/2})_y$   Chemical Formula 1-4

$(GpSiO_{3/2})_x((Me)_2SiO_{2/2})_y$   Chemical Formula 1-5

$(GpSiO_{3/2})_x(GpMeSiO_{2/2})_y$   Chemical Formula 1-6

$(OpSiO_{3/2})_x(EcMeSiO_{2/2})_y$   Chemical Formula 1-7

$(OpSiO_{3/2})_x((Me)_2SiO_{2/2})_y$   Chemical Formula 1-8

$(OpSiO_{3/2})_x(GpMeSiO_{2/2})_y$   Chemical Formula 1-9 wherein, in Chemical Formulae 1-1 to 1-9, Ec is a (3,4-epoxycyclohexyl)ethyl group, Me is a methyl group, Gp is a 3-glycidoxypropyl group, Op is a 3-oxetanylpropyl group, $0<x<1$, $0<y<1$, and $x+y=1$.

5. The flexible plastic substrate of claim 1, wherein the siloxane copolymer represented by Chemical Formula 2 is further represented by at least one of Chemical Formulae 2-1 to 2-12:

$(EcSiO_{3/2})_x(R^aSiO_{3/2})_z$   Chemical Formula 2-1

$(EcSiO_{3/2})_x(R^bSiO_{3/2})_z$   Chemical Formula 2-2

$(EcSiO_{3/2})_x(R^cSiO_{3/2})_z$   Chemical Formula 2-3

$(EcSiO_{3/2})_x(R^dSiO_{3/2})_z$   Chemical Formula 2-4

$(GpSiO_{3/2})_x(R^aSiO_{3/2})_z$   Chemical Formula 2-5

$(GpSiO_{3/2})_x(R^bSiO_{3/2})_z$   Chemical Formula 2-6

$(GpSiO_{3/2})_x(R^cSiO_{3/2})_z$   Chemical Formula 2-7

$(GpSiO_{3/2})_x(R^dSiO_{3/2})_z$   Chemical Formula 2-8

$(OpSiO_{3/2})_x(R^aSiO_{3/2})_z$   Chemical Formula 2-9

$(OpSiO_{3/2})_x(R^bSiO_{3/2})_z$   Chemical Formula 2-10

$(OpSiO_{3/2})_x(R^cSiO_{3/2})_z$   Chemical Formula 2-11

$(OpSiO_{3/2})_x(R^dSiO_{3/2})_z$   Chemical Formula 2-12 wherein, in Chemical Formulae 2-1 to 2-12, Ec is a (3,4-epoxycyclohexyl)ethyl group, Gp is a 3-glycidoxypropyl group, Op is a 3-oxetanylpropyl group, $R^a$ is represented by Chemical Formula i, $R^b$ is represented by Chemical Formula ii, $R^c$ is represented by Chemical Formula iii, $R^d$ is represented by Chemical Formula iv, $0<x<1$, $0<z<1$, and $x+z=1$:

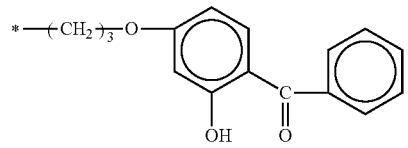

Chemical Formula i

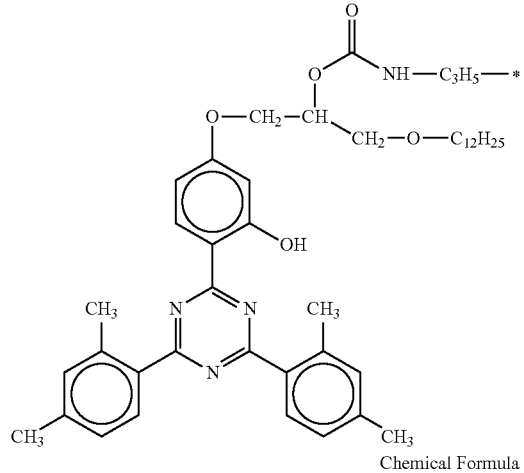

Chemical Formula ii

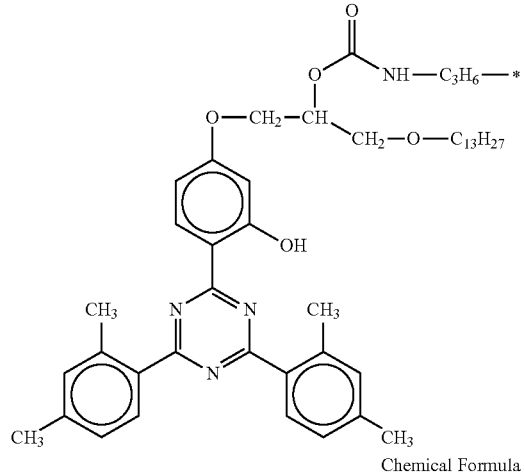

Chemical Formula iii

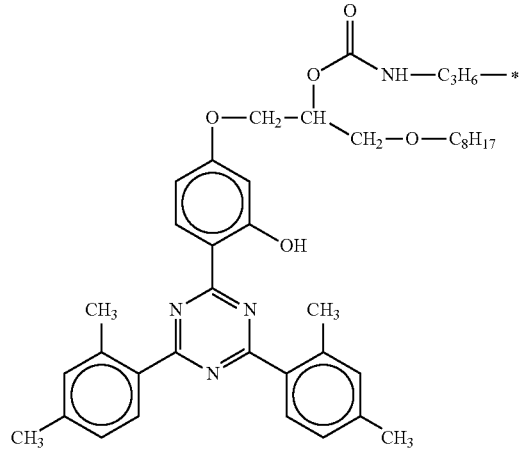

Chemical Formula iv wherein in Chemical Formula i to Chemical Formula iv, * indicates a linking point.

6. The flexible plastic substrate of claim 1, wherein the siloxane copolymer represented by Chemical Formula 3 is further represented by at least one of Chemical Formulae 3-1 to 3-36:

$(EcSiO_{3/2})_x(EcMeSiO_{2/2})_y(R^aSiO_{3/2})_z$  Chemical Formula 3-1

$(EcSiO_{3/2})_x(EcMeSiO_{2/2})_y(R^bSiO_{3/2})_z$  Chemical Formula 3-2

$(EcSiO_{3/2})_x(EcMeSiO_{2/2})_y(R^cSiO_{3/2})_z$  Chemical Formula 3-3

$(EcSiO_{3/2})_x(EcMeSiO_{2/2})_y(R^dSiO_{3/2})_z$  Chemical Formula 3-4

$(EcSiO_{3/2})_x((Me)_2SiO_{2/2})_y(R^aSiO_{3/2})_z$  Chemical Formula 3-5

$(EcSiO_{3/2})_x((Me)_2SiO_{2/2})_y(R^bSiO_{3/2})_z$  Chemical Formula 3-6

$(EcSiO_{3/2})_x((Me)_2SiO_{2/2})_y(R^cSiO_{3/2})_z$  Chemical Formula 3-7

$(EcSiO_{3/2})_x((Me)_2SiO_{2/2})_y(R^dSiO_{3/2})_z$  Chemical Formula 3-8

$(EcSiO_{3/2})_x(GpMeSiO_{2/2})_y(R^aSiO_{3/2})_z$  Chemical Formula 3-9

$(EcSiO_{3/2})_x(GpMeSiO_{2/2})_y(R^bSiO_{3/2})_z$  Chemical Formula 3-10

$(EcSiO_{3/2})_x(GpMeSiO_{2/2})_y(R^cSiO_{3/2})_z$  Chemical Formula 3-11

$(EcSiO_{3/2})_x(GpMeSiO_{2/2})_y(R^dSiO_{3/2})_z$  Chemical Formula 3-12

$(GpSiO_{3/2})_x(EcMeSiO_{2/2})_y(R^aSiO_{3/2})_z$  Chemical Formula 3-13

$(GpSiO_{3/2})_x(EcMeSiO_{2/2})_y(R^bSiO_{3/2})_z$  Chemical Formula 3-14

$(GpSiO_{3/2})_x(EcMeSiO_{2/2})_y(R^cSiO_{3/2})_z$  Chemical Formula 3-15

$(GpSiO_{3/2})_x(EcMeSiO_{2/2})_y(R^dSiO_{3/2})_z$  Chemical Formula 3-16

$(GpSiO_{3/2})_x((Me)_2SiO_{2/2})_y(R^aSiO_{3/2})_z$  Chemical Formula 3-17

$(GpSiO_{3/2})_x((Me)_2SiO_{2/2})_y(R^bSiO_{3/2})_z$  Chemical Formula 3-18

$(GpSiO_{3/2})_x((Me)_2SiO_{2/2})_y(R^cSiO_{3/2})_z$  Chemical Formula 3-19

$(GpSiO_{3/2})_x((Me)_2SiO_{2/2})_y(R^dSiO_{3/2})_z$  Chemical Formula 3-20

$(GpSiO_{3/2})_x(GpMeSiO_{2/2})_y(R^aSiO_{3/2})_z$  Chemical Formula 3-21

$(GpSiO_{3/2})_x(GpMeSiO_{2/2})_y(R^bSiO_{3/2})_z$  Chemical Formula 3-22

$(GpSiO_{3/2})_x(GpMeSiO_{2/2})_y(R^cSiO_{3/2})_z$  Chemical Formula 3-23

$(GpSiO_{3/2})_x(GpMeSiO_{2/2})_y(R^dSiO_{3/2})_z$  Chemical Formula 3-24

$(OpSiO_{3/2})_x(EcMeSiO_{2/2})_y(R^aSiO_{3/2})_z$  Chemical Formula 3-25

$(OpSiO_{3/2})_x(EcMeSiO_{2/2})_y(R^bSiO_{3/2})_z$  Chemical Formula 3-26

$(OpSiO_{3/2})_x(EcMeSiO_{2/2})_y(R^cSiO_{3/2})_z$  Chemical Formula 3-27

$(OpSiO_{3/2})_x(EcMeSiO_{2/2})_y(R^dSiO_{3/2})_z$  Chemical Formula 3-28

$(OpSiO_{3/2})_x((Me)_2SiO_{2/2})_y(R^aSiO_{3/2})_z$  Chemical Formula 3-29

$(OpSiO_{3/2})_x((Me)_2SiO_{2/2})_y(R^bSiO_{3/2})_z$  Chemical Formula 3-30

$(OpSiO_{3/2})_x((Me)_2SiO_{2/2})_y(R^cSiO_{3/2})_z$  Chemical Formula 3-31

$(OpSiO_{3/2})_x((Me)_2SiO_{2/2})_y(R^dSiO_{3/2})_z$  Chemical Formula 3-32

$(OpSiO_{3/2})_x(GpMeSiO_{2/2})_y(R^aSiO_{3/2})_z$  Chemical Formula 3-33

$(OpSiO_{3/2})_x(GpMeSiO_{2/2})_y(R^bSiO_{3/2})_z$  Chemical Formula 3-34

$(OpSiO_{3/2})_x(GpMeSiO_{2/2})_y(R^cSiO_{3/2})_z$  Chemical Formula 3-35

$(OpSiO_{3/2})_x(GpMeSiO_{2/2})_y(R^dSiO_{3/2})_z$  Chemical Formula 3-36 wherein, in Chemical Formulae 3-1 to 3-36, Ec is a 3,4-epoxycyclohexylethyl group, Me is a methyl group, Gp is a 3-glycidoxypropyl group, Op is a 3-oxetanylpropyl group, $R^a$ is represented by Chemical Formula i, $R^b$ is represented by Chemical Formula ii, $R^c$ is represented by Chemical Formula iii, $R^d$ is represented by Chemical Formula iv, $0<x<1$, $0<y<1$, $0<z<1$, and $x+y+z=1$:

Chemical Formula i

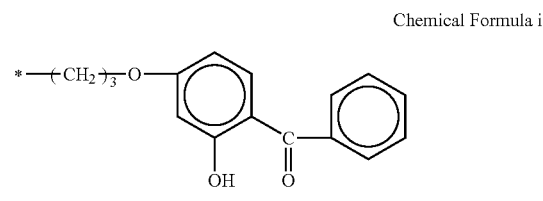

Chemical Formula ii

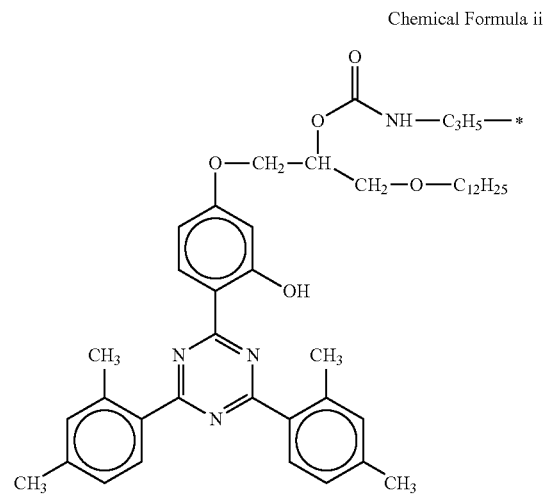

Chemical Formula iii

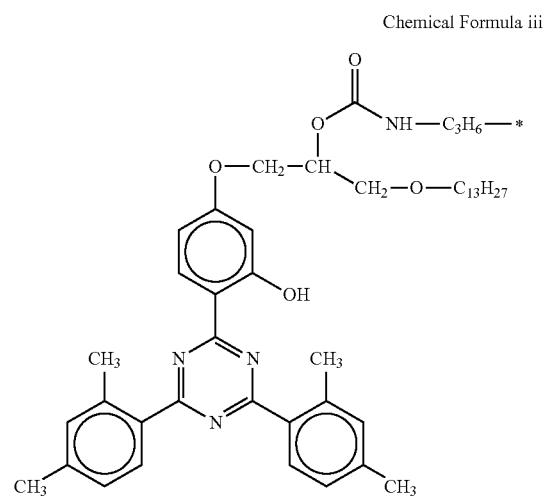

Chemical Formula iv

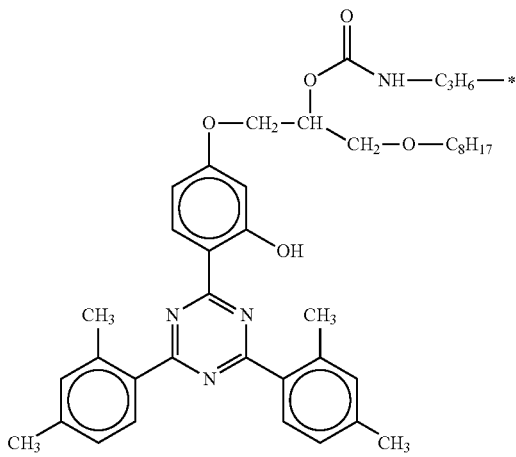

Chemical Formula 6

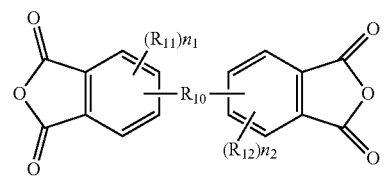

wherein in Chemical Formula i to Chemical Formula iv, * indicates a linking point.

7. The flexible plastic substrate of claim 1, wherein the hard coating layer further comprises a nanoparticle.

8. The flexible plastic substrate of claim 7, wherein the nanoparticle comprises silica, titania, barium titanate, zirconia, barium sulfate, alumina, hafnium oxide, or a combination thereof.

9. The flexible plastic substrate of claim 1, wherein the hard coating layer further comprises a colorant having a maximum visible absorption peak at a wavelength of greater than or equal to 570 nanometers.

10. The flexible plastic substrate of claim 1, further comprising a rear coating layer disposed on a second surface of the film opposite from the first surface on which the hard coating layer is disposed.

11. The flexible plastic substrate of claim 10, wherein the rear coating layer comprises a colorant having a maximum visible absorption peak at a wavelength of greater than or equal to 570 nanometers.

12. The flexible plastic substrate of claim 10, wherein the rear coating layer comprises a (meth)acrylate polymer, a polycaprolactone, a urethane-(meth)acrylate copolymer, polyrotaxane, an epoxy resin, perfluoropolyether, a crosslinked or uncrosslinked siloxane copolymer, or a combination thereof.

13. The flexible plastic substrate of claim 10, wherein a thickness of the rear coating layer ranges from about 30 nanometers to about 300 nanometers.

14. The flexible plastic substrate of claim 1, wherein a thickness of the poly(amide-imide) copolymer film ranges from about 10 micrometers to about 200 micrometers.

15. The flexible plastic substrate of claim 1, wherein a thickness of the hard coating layer ranges from about 5 micrometers to about 50 micrometers.

16. The plastic substrate of claim 1, wherein the poly(amide-imide) copolymer is a product of a reaction between a tetracarboxylic acid dianhydride represented by Chemical Formula 6, a diamine represented by Chemical Formula 7, and a dicarboxylic acid derivative represented by Chemical Formula 9:

wherein, in Chemical Formula 6, $R^{10}$ is a single bond, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$—, or —C(=O)NH—, wherein 1≤n≤10, 1≤p≤10, and 1≤q≤10, $R^{11}$ and $R^{12}$ are each the same or different and are independently a halogen, a hydroxy group, a substituted or unsubstituted C1 to C10 aliphatic group, a substituted or unsubstituted C6 to C20 aryl group, a group of the formula —OR$^{201}$ wherein R$^{201}$ is a C1 to C10 aliphatic group, or a group of the formula —SiR$^{210}$R$^{211}$R$^{212}$ wherein R$^{210}$, R$^{211}$, and R$^{212}$ are each the same or different and are independently hydrogen or a C1 to C10 aliphatic group, and n1 and n2 are each the same or different and are independently an integer of 0 to 3, $$NH_2—R^{13}—NH_2 \qquad \text{Chemical Formula 7}$$

wherein, in Chemical Formula 7, $R^{13}$ is represented by Chemical Formula 8:

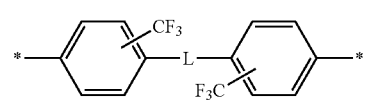

Chemical Formula 8 wherein, in Chemical Formula 8,

L is a single bond, —CONH—, -Ph-CONH-Ph-, or —NHCO-Ph-CONH—, wherein Ph is a substituted or unsubstituted phenylene group, each linked to adjacent groups in an ortho, meta, or para configuration, and * is a point linked to nitrogen of an amino group, $$X^1—CO—R^{14}—CO—X^2 \qquad \text{Chemical Formula 9}$$

wherein, in Chemical Formula 9, $X^1$ and $X^2$ are each independently the same or different halogen, and $R^{14}$ is a phenylene group or a biphenylene group.

17. The flexible plastic substrate of claim 16, wherein the tetracarboxylic acid dianhydride represented by Chemical Formula 6 is further represented by at least one of Chemical Formula 10 and Chemical Formula 11, the diamine represented by Chemical Formula 7 is 2,2'-bis(trifluoromethyl) benzidine, and the dicarboxylic acid derivative represented by Chemical Formula 9 is terephthaloyl chloride:

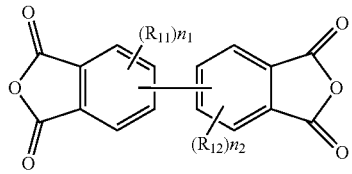

Chemical Formula 10

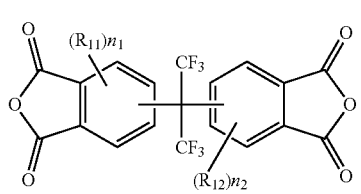

Chemical Formula 11 wherein, in Chemical Formula 10 and Chemical Formula 11, $R_{11}$, $R_{12}$, $n_1$, and $n_2$ are each the same as defined in Chemical Formula 6.

18. The flexible plastic substrate of claim 17, wherein the poly(amide-imide) copolymer is a product of a reaction between 2,2'-bis(trifluoromethyl)benzidine, the tetracarboxylic acid dianhydride represented by at least one of Chemical Formula 10 and Chemical Formula 11, and terephthaloyl chloride in a mole ratio of 1:0.1 to 0.5:0.5 to 0.9.

19. A display device comprising the flexible plastic substrate of claim 1.

* * * * *